(12) United States Patent
Oikawa et al.

(10) Patent No.: US 7,831,118 B2
(45) Date of Patent: Nov. 9, 2010

(54) COARSE WAVELENGTH DIVISION MULTIPLEXING OPTICAL TRANSMISSION SYSTEM, AND COARSE WAVELENGTH DIVISION MULTIPLEXING OPTICAL TRANSMISSION METHOD

(75) Inventors: Yoichi Oikawa, Yokohama (JP); Takashi Toyomaki, Yokohama (JP); Tomoyuki Ohtsuka, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/041,433

(22) Filed: Jan. 25, 2005

(65) Prior Publication Data

US 2005/0220397 A1   Oct. 6, 2005

Related U.S. Application Data

(63) Continuation-in-part of application No. 10/895,325, filed on Jul. 21, 2004, now abandoned.

(30) Foreign Application Priority Data

Mar. 31, 2004 (JP) .............................. 2004-101764
Sep. 9, 2004 (JP) .............................. 2004-262153

(51) Int. Cl.
*G02B 6/28* (2006.01)
*H04J 14/02* (2006.01)

(52) U.S. Cl. ............................. 385/24; 398/82; 398/91
(58) Field of Classification Search .................. 385/24; 398/82, 91

See application file for complete search history.

(56) References Cited

U.S. PATENT DOCUMENTS 5,778,118 A * 7/1998 Sridhar ........................ 385/24

(Continued)

FOREIGN PATENT DOCUMENTS

DE    203 00 459    1/2003

(Continued)

OTHER PUBLICATIONS

ADVA Optical Networking. Martinsried/Munich and Mahwad/NJ., "ADVA Launches Major CWDM Feature Release for FSP 2000".

(Continued)

*Primary Examiner*—Jerry T Rahll
(74) *Attorney, Agent, or Firm*—Staas & Halsey LLP

(57) ABSTRACT

In a CWDM optical transmission system of the present invention, in place of an optical signal of at least one wave among a plurality of optical signals corresponding to a CWDM system, a DWDM light output from an additional light transmission unit of a DWDM system is given to a multiplexer via a variable optical attenuator, and multiplexed with the optical signals corresponding to CWDM, to be sent out to a transmission path. At this time, the total power of the DWDM light sent out to the transmission path, is attenuated by the variable optical attenuator, so as to be approximately equal to the power per one wavelength of the CWDM light. On an optical reception terminal, the light propagated through the transmission path is demultiplexed by a demultiplexer, and the DWDM light corresponding to the additional wavelengths is amplified by an optical amplifier and thereafter, received by an additional light reception unit. As a result, the addition of optical signals in the CWDM system can be realized at low-cost, while avoiding the reduction in transmission quality.

17 Claims, 23 Drawing Sheets

U.S. PATENT DOCUMENTS

| | | | |
|---|---|---|---|
| 5,933,552 A * | 8/1999 | Fukushima et al. | 385/24 |
| 6,205,268 B1 * | 3/2001 | Chraplyvy et al. | 385/24 |
| 6,693,738 B2 * | 2/2004 | Islam | 359/334 |
| 2002/0141008 A1 * | 10/2002 | Chbat et al. | 359/110 |
| 2003/0067652 A1 | 4/2003 | Harada et al. | |

FOREIGN PATENT DOCUMENTS

| | | |
|---|---|---|
| EP | 0 964 275 | 12/1999 |
| JP | 2000-244404 | 9/2000 |
| JP | 2002-300137 | 10/2002 |
| JP | 2003-115822 | 4/2003 |
| WO | 2004/066534 | 8/2004 |

OTHER PUBLICATIONS

H. Hinderthur, et al., "WDM hybrid transmission based on CWDM plus DWDM," Jul. 2003, pp. 1-4.

P. Iannone, et al., "In-Service Upgrade of an Amplified 130-km Metro CWDM Transmission System Using a Single LOA with 140-nm Bandwidth," vol. 2, OFC 2003, pp. 548-550.

International Search Report in corresponding Application No. PCT/JP2005/006234 dated Jul. 12, 2005.

Antosik, Roman, "Super-Channel Architectures for In-Service Capacity Expansion of CWDM/DWDM Systems," IEEE, vol. 2, pp. 86, Jun. 29, 2003.

Sakamoto, T. et al., "Wide Wavelength Band (1535-1560nm and 1574-1600nm), 28X10Gbit/s WDM Transmission Over 320 km Dispersion-shifted Fibre," Electronic Letters, IEE, vol. 34, No. 4, Feb. 19, 1998.

"Optical Interfaces for Multichannel Systems with Optical Amplifiers," ITU-T Recommendation G.692, pp. 1-31, Jun. 2002.

"Spectral Grids for WDM Applications: DWDM Frequency Grid," ITU-T Recommendation G.694.1, pp. 1-5, Oct. 1998.

European Search Report issued Jun. 13, 2007 in corresponding European Application No. 05001595.7-1237.

Korean Office Action for corresponding Korean Application 10-2006-7013122; dated Apr. 26, 2007.

Japanese Office Action mailed Nov. 17, 2009 in corresponding Japanese Patent Application 2006-511779.

* cited by examiner

FIG.14
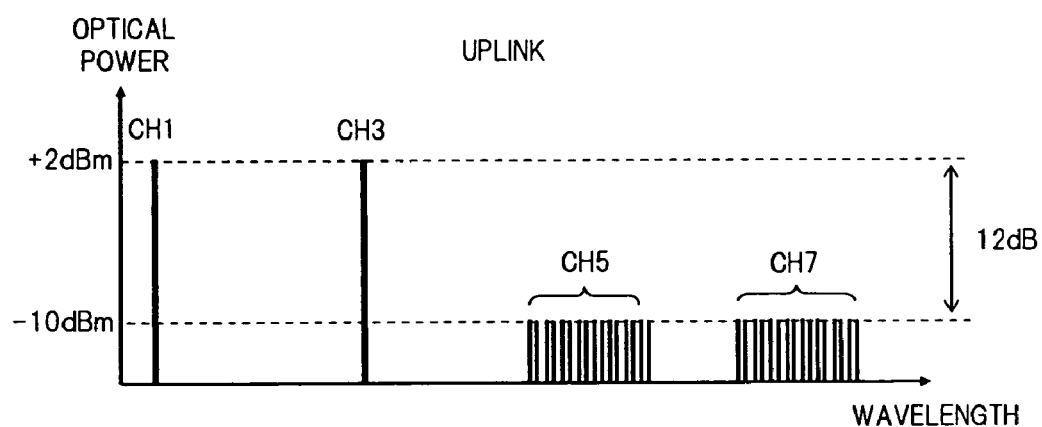
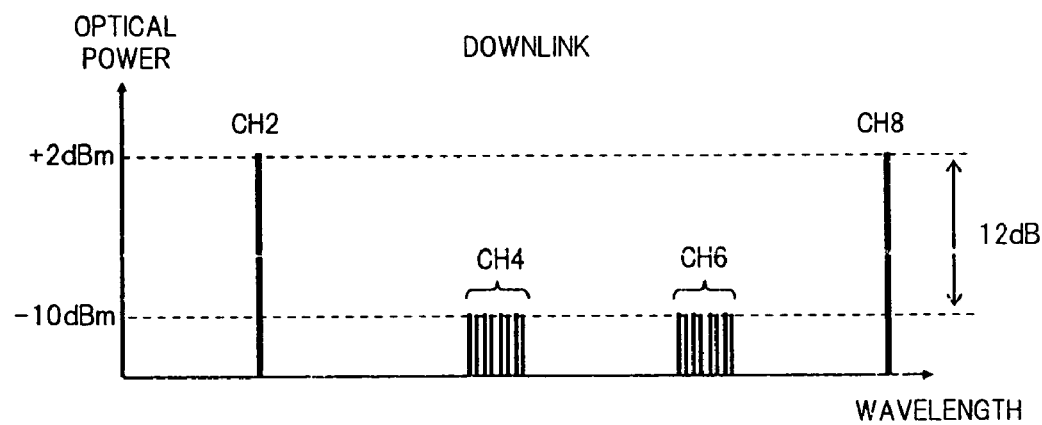

(A)

DWDM SIGNAL ARRANGEMENT IN 1530nm BAND

| CH | WAVELENGTH (nm) | FREQUENCY (THz) |
|---|---|---|
| 1' | 1528.77 | 196.1 |
| 2' | 1529.55 | 196.0 |
| 3' | 1530.33 | 195.9 |
| 4' | 1531.12 | 195.8 |
| 5' | 1531.90 | 195.7 |
| 6' | 1532.68 | 195.6 |
| 7' | 1533.47 | 195.5 |
| 8' | 1534.25 | 195.4 |
| 9' | 1535.04 | 195.3 |
| 10' | 1535.82 | 195.2 |
| 11' | 1536.61 | 195.1 |
| 12' | 1537.40 | 195.0 |
| 13' | 1538.19 | 194.9 |
| 14' | 1538.98 | 194.8 |
| 15' | 1539.77 | 194.7 |

FREQUENCY BAND 900GHz

DWDM SIGNAL ARRANGEMENT IN 1550nm BAND

| CH | WAVELENGTH (nm) | FREQUENCY (THz) |
|---|---|---|
| 16' | 1540.56 | 194.6 |
| 17' | 1541.35 | 194.5 |
| 18' | 1542.14 | 194.4 |
| 19' | 1542.94 | 194.3 |
| 20' | 1543.73 | 194.2 |
| 21' | 1544.53 | 194.1 |
| 22' | 1545.32 | 194.0 |
| 23' | 1546.12 | 193.9 |
| 24' | 1546.92 | 193.8 |
| 25' | 1547.72 | 193.7 |
| 26' | 1548.51 | 193.6 |
| 27' | 1549.32 | 193.5 |
| 28' | 1550.12 | 193.4 |
| 29' | 1550.92 | 193.3 |
| 30' | 1551.72 | 193.2 |
| 31' | 1552.52 | 193.1 |
| 32' | 1553.33 | 193.0 |
| 33' | 1554.13 | 192.9 |
| 34' | 1554.94 | 192.8 |
| 35' | 1555.75 | 192.7 |
| 36' | 1556.55 | 192.6 |
| 37' | 1557.36 | 192.5 |
| 38' | 1558.17 | 192.4 |
| 39' | 1558.98 | 192.3 |
| 40' | 1559.79 | 192.2 |

FREQUENCY BAND 1500GHz

EXAMPLE OF DWDM SIGNAL ARRANGEMENT IN 1530nm BAND

| CH | WAVELENGTH (nm) | FREQUENCY (THz) |
|---|---|---|
| 1' | 1528.77 | 196.1 |
| 3' | 1530.33 | 195.9 |
| 6' | 1532.68 | 195.6 |
| 10' | 1535.82 | 195.2 |

| CH | WAVELENGTH (nm) | FREQUENCY (THz) |
|---|---|---|
| 1' | 1528.77 | 196.1 |
| 4' | 1531.12 | 195.8 |
| 8' | 1534.25 | 195.4 |
| 10' | 1535.82 | 195.2 |

| CH | WAVELENGTH (nm) | FREQUENCY (THz) |
|---|---|---|
| 1' | 1528.77 | 196.1 |
| 3' | 1530.33 | 195.9 |
| 7' | 1533.47 | 195.5 |
| 10' | 1535.82 | 195.2 |

| CH | WAVELENGTH (nm) | FREQUENCY (THz) |
|---|---|---|
| 1' | 1528.77 | 196.1 |
| 5' | 1531.90 | 195.7 |
| 7' | 1533.47 | 195.5 |
| 10' | 1535.82 | 195.2 |

| CH | WAVELENGTH (nm) | FREQUENCY (THz) |
|---|---|---|
| 1' | 1528.77 | 196.1 |
| 4' | 1531.12 | 195.8 |
| 6' | 1532.68 | 195.6 |
| 10' | 1535.82 | 195.2 |

| CH | WAVELENGTH (nm) | FREQUENCY (THz) |
|---|---|---|
| 1' | 1528.77 | 196.1 |
| 5' | 1531.90 | 195.7 |
| 8' | 1534.25 | 195.4 |
| 10' | 1535.82 | 195.2 |

EXAMPLE OF DWDM SIGNAL ARRANGEMENT IN 1550nm BAND

| CH | WAVELENGTH (nm) | FREQUENCY (THz) |
|---|---|---|
| 23' | 1546.12 | 193.9 |
| 25' | 1547.72 | 193.7 |
| 28' | 1550.12 | 193.4 |
| 32' | 1553.33 | 193.0 |

| CH | WAVELENGTH (nm) | FREQUENCY (THz) |
|---|---|---|
| 23' | 1546.12 | 193.9 |
| 26' | 1548.51 | 193.6 |
| 30' | 1551.72 | 193.2 |
| 32' | 1553.33 | 193.0 |

| CH | WAVELENGTH (nm) | FREQUENCY (THz) |
|---|---|---|
| 23' | 1546.12 | 193.9 |
| 25' | 1547.72 | 193.7 |
| 29' | 1550.92 | 193.3 |
| 32' | 1553.33 | 193.0 |

| CH | WAVELENGTH (nm) | FREQUENCY (THz) |
|---|---|---|
| 23' | 1546.12 | 193.9 |
| 27' | 1549.32 | 193.5 |
| 29' | 1550.92 | 193.3 |
| 32' | 1553.33 | 193.0 |

| CH | WAVELENGTH (nm) | FREQUENCY (THz) |
|---|---|---|
| 23' | 1546.12 | 193.9 |
| 26' | 1548.51 | 193.6 |
| 28' | 1550.12 | 193.4 |
| 32' | 1553.33 | 193.0 |

| CH | WAVELENGTH (nm) | FREQUENCY (THz) |
|---|---|---|
| 23' | 1546.12 | 193.9 |
| 27' | 1549.32 | 193.5 |
| 30' | 1551.72 | 193.2 |
| 32' | 1553.33 | 193.0 |

FIG.24
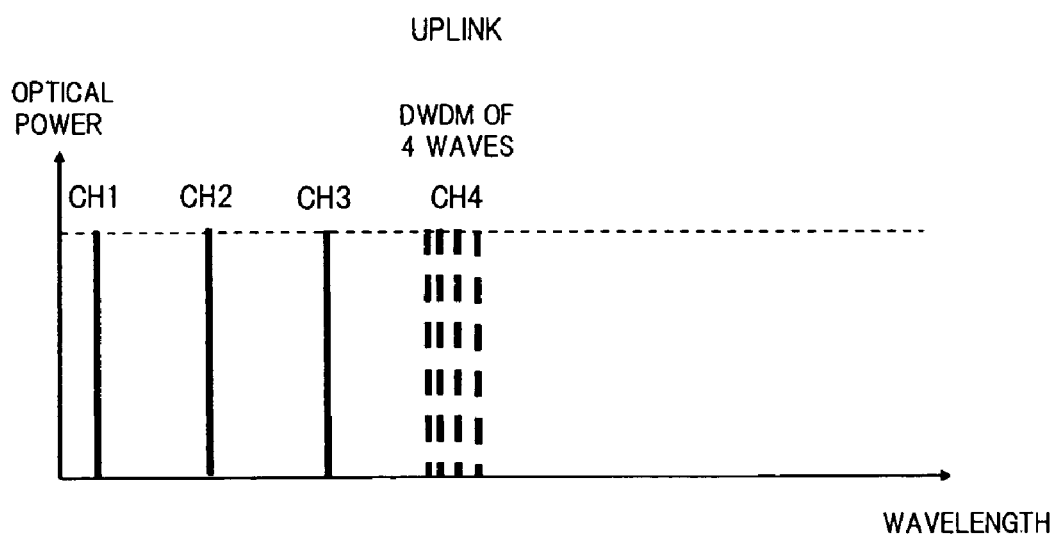
下り回線
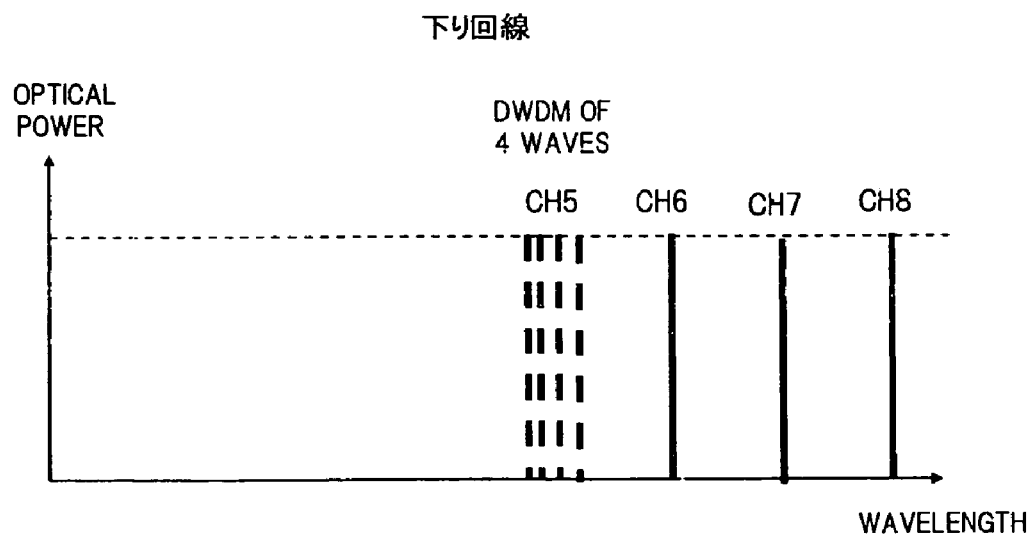

COARSE WAVELENGTH DIVISION MULTIPLEXING OPTICAL TRANSMISSION SYSTEM, AND COARSE WAVELENGTH DIVISION MULTIPLEXING OPTICAL TRANSMISSION METHOD

The present application is a continuation-in-part of U.S. patent application Ser. No. 10/895,325, filed Jul. 21, 2004 now abandoned, the complete disclosure of which is incorporated herein by reference in its entirely.

BACKGROUND OF THE INVENTION (1) Field of the Invention

The present invention relates to an optical transmission system and an optical transmission method, for transmitting a wavelength division multiplexed light containing a plurality of optical signals of different wavelengths, by the use of an optical fiber, and in particular, relates to technology for adding optical signals in a coarse wavelength division multiplexing system.

(2) Related Art

A dense wavelength division multiplexing (hereafter referred to as DWDM) system, which deals with a plurality of optical signals of 0.8 nm inter-wavelength and further at 0.4 nm, has been developed, and is now in practical use, as a communication system enabling a dramatic increase in transmission capacity. This DWDM system can normally be operated with a number of signals of between 32 and 128 waves, however, in order to accurately manage wavelengths, requires expensive light source and wavelength management equipment. Therefore, the cost of the DWDM system is high even when operated with a small number of signals.

Therefore, a system is earnestly desired, which realizes a low-cost WDM system, which is operated with a small number of signals by increasing a signal wavelength interval to an extent wherein a highly accurate wavelength management becomes unnecessary. Recently, a coarse wavelength division multiplexing (hereafter referred to as CWDM) system capable of dealing with up to optical signals of 8 waves (8 channels) having 20 nm inter-wavelength, has been developed and is now in commercial use. A demand for this CWDM system extends over a wide range of from an application in access having a comparatively small transmission capacity (for example, metropolitan areas and the like) to LANs within buildings. Furthermore, owners of optical fiber networks such as public organizations, electric power companies, and communication carrier manufacturers and the like have commenced the line renting using a dark fiber (optical fiber installed but not in use). In this case, as well, when the transmission capacity is comparatively small, since it is necessary to provide a low-cost service, and the aforementioned CWDM system is suitable.

However, it is demanded that the CWDM system is capable to hold not only optical signals in conformity with Synchronous Digital Hierarchy (SDH) being the international standard for a high-speed digital communication system using an optical fiber, but also optical signals used in an Ethernet data communication. In order to respond to this demand, a technology for enabling the number of signals to be added up to 8 or more channels in the existing CWDM system is necessary.

Conventionally, a system for adding the number of signals in the CWDM system so as to exceed a general standard value, has not been supported by the equipment manufacturer, and a maximum of 8 channels (16 channels at full-band) could be dealt with. Consideration has recently been given to add the number of signals by merging CWDM and DWDM systems (refer to the following first and second literatures).

First Literature

ADVA Optical Networking, "ADVA Launches Major CWDM Feature Release for FSP 2000", [online], Oct. 28, 2003, Internet <URL: http://www.advaoptical.com/adva_press.asp?id=66&action=view&msgid=331>

Second Literature

H. Hinderthür and L Friedric, "WDM hybrid transmission based on CWDM plus DWDM", Lightwave Europe, volume 2, Issue 7, [online], July 2003, Internet <URL: http://lw.pennnet.com/Articles/Article=_Display.cfm?Section=ARCHI& ARTICLE_ID=183295&VERSION_NUM=1&p=63>

However, in the above described conventional technology, only the method of connecting optical signals for the DWDM system to the CWDM system has been considered, and the method of transmitting the connected optical signals for the DWDM system over the optical fiber has not been considered. Therefore, an effective optical fiber transmission has been difficult. That is to say, in the case where optical signals of a plurality of wavelengths operated in the DWDM system are connected directly to the CWDM system while the setting of the power, the inter-wavelength or the like thereof being unchanged, and the number of signals in the CWDM system are added, such a problem is considered in that the waveform deterioration due to a nonlinear effect of the optical fiber or an increase of noise and the like due to cross-talk caused by a characteristic of an optical multiplexer/demultiplexer for the CWDM system occurs in the added optical signal of the DWDM side, resulting in the reduction in transmission quality.

SUMMARY OF THE INVENTION

The present invention has been accomplished in view of the above problem and has an object of providing a CWDM optical transmission system and a CWDM optical transmission method, capable of realizing at low-cost an increase of the number of optical signals in a CWDM system by utilizing an optical transmission apparatus used in a DWDM system, and at the same time, avoiding the reduction in transmission quality.

In order to achieve the aforementioned object, a CWDM optical transmission system of the present invention comprises: an optical transmission terminal including a plurality of first optical transmitters which generate a plurality of optical signals arranged on a first wavelength grid corresponding to a CWDM system and a first multiplexer which multiplexes the optical signals output from the first optical transmitters to send out a CWDM light to a transmission path; and an optical reception terminal including a first demultiplexer which demultiplexes the CWDM light transmitted from the optical transmission terminal via the transmission path and a plurality of first optical receivers which receive optical signals of respective wavelengths output from the first demultiplexer. In one aspect of this CWDM transmission system, at least one wavelength on the first wavelength grid is set as an additional wavelength. Then, the optical transmission terminal, in place of the first optical transmitter corresponding to the additional wavelength, is provided with an additional light transmission unit including; a plurality of second optical transmitters which generate a plurality of optical signals arranged within a passband including the additional wavelength of the first multiplexer, on a second wavelength grid corresponding to a DWDM system, and a second multiplexer which multiplexes optical signals output from the second optical transmitters to output a DWDM light to the first multiplexer, and also provided with an optical attenuator which attenuates the DWDM light output from the additional light transmission unit so that the total power of the DWDM light sent out from the additional light transmission unit via the first multiplexer to the transmission path is approximately equal to the power per one wavelength of the optical signals, which are output from the first optical transmitters, corresponding to wavelengths other than the additional wavelength. Moreover, the optical reception terminal, in place of the first optical receiver corresponding to the additional wavelength, is provided with an additional light reception unit including; a second demultiplexer which demultiplexes the DWDM light output from the first demultiplexer, and a plurality of second optical receivers which receive optical signals of respective wavelengths output from the second demultiplexer, and also provided with an optical amplifier which amplifies the DWDM light output from the first demultiplexer at a gain according to an attenuation amount of the optical attenuator.

According to the CWDM optical transmission system in the above aspect, in place of the optical signal of at least one wavelength among the plurality of optical signals corresponding to the CWDM system, the DWDM light output from the additional light transmission unit is given to the first multiplexer, and this DWDM light is multiplexed with the CWDM light of the wavelengths other than the additional wavelength, to be sent out to the transmission path. Since the total power of the DWDM light sent out to the transmission path at this time is attenuated by the optical attenuator so as to be approximately equal to the power per one wavelength of the CWDM light, the CWDM light and the added DWDM light are transmitted up to the optical reception terminal without an occurrence of nonlinear effect in the transmission path. In the optical reception terminal, the light output from the transmission path is demultiplexed by the first demultiplexer, and the optical signals of respective wavelengths corresponding to the CWDM system are received by the first optical receivers, respectively, and the DWDM light corresponding to the additional wavelength is sent to the optical amplifier to be amplified at the gain according to the attenuation amount in the optical attenuator on the optical transmission terminal side. Then, the DWDM light output from the optical amplifier is demultiplexed in the second demultiplexer in the additional light reception unit, and then, the optical signals of respective wavelengths are received by the second optical receivers, respectively.

Further, in another aspect of the CWDM optical transmission system according to the present invention, at least one of wavelengths 1530 nm and 1550 nm among wavelengths of the plurality of optical signals arranged on the first wavelength grid is set as an additional wavelength. Then, the optical transmission terminal, in place of the first optical transmitter corresponding to the additional wavelength, is provided with an additional light transmission unit including; a plurality of second optical transmitters which generate optical signals of 3 or 4 waves arranged at uneven intervals within a passband including the additional wavelength of the first multiplexer, on a second wavelength grid corresponding to a DWDM system, and a second multiplexer which multiplexes optical signals output from the second optical transmitters to output a DWDM light to the first multiplexer. Moreover, the optical reception terminal, in place of the first optical receiver corresponding to the additional wavelength, is provided with an additional light reception unit including; a second demultiplexer which demultiplexes the DWDM light output from the first demultiplexer, and a plurality of second optical receivers which receive optical signals of respective wavelengths output from the second demultiplexer.

According to the CWDM optical transmission system in another aspect as described above, in place of the optical signal of the wavelength corresponding to 1530 nm or 1550 nm among the plurality of optical signals corresponding to the CWDM system, the optical signals of 3 or 4 waves arranged at uneven intervals on the second wavelength grid corresponding to the DWDM system are output from the additional light transmission unit, and this DWDM light is given to the first multiplexer and multiplexed with the CWDM light of the wavelengths other than the additional wavelength, to be sent out to the transmission path. Since the DWDM light sent out to the transmission path at this time is set so that the signals thereof are arranged at uneven intervals, even if the four wave mixing (FWM) being one of no-linear effects occurs in the transmission path, a frequency (wavelength) of an idler light due to the FWM does not overlap with a frequency (wavelength) of the DWDM light. Therefore, the CWDM light and the added DWDM light are transmitted up to the optical reception terminal without an occurrence of crosstalk between the DWDM light and the idler light due to the FWM. In the optical reception terminal, the light output from the transmission path is demultiplexed by the first demultiplexer, and the optical signals of respective wavelengths corresponding to the CWDM system are received by the first optical receivers, respectively, and the DWDM light corresponding to the additional wavelength is demultiplexed in the second demultiplexer in the additional light reception unit, and then, the optical signals of respective wavelengths are received by the second optical receivers, respectively.

According to the above described CWDM optical transmission system of the present invention, the addition of optical signals in the CWDM system can be realized at a low-cost utilizing an optical transmission apparatus used in the DWDM system, while avoiding the reduction in transmission quality due to the nonlinear effect in the transmission path. As a result, it becomes possible to add the optical signals so as to exceed the maximum number of signals in the CWDM system.

Other objects, features, and advantages of the present invention will become apparent from the following description of the embodiments, in conjunction with the appended drawings.

BRIEF DESCRIPTION OF THE DRAWINGS

FIG. 14 is a diagram showing an example of the power of each optical signal during transmission in the fifth embodiment.

FIG. 19 is a diagram showing specific signal arrangement examples in the case where arrangement intervals of optical signals in 1530 nm band and 1550 nm band are set at 200 GHz, 300 GHz and 400 GHz.

FIG. 24 is a pattern diagram showing the signal arrangement corresponding to the system configuration example in FIG. 23.

DETAILED DESCRIPTION OF THE INVENTION

Figure 1:
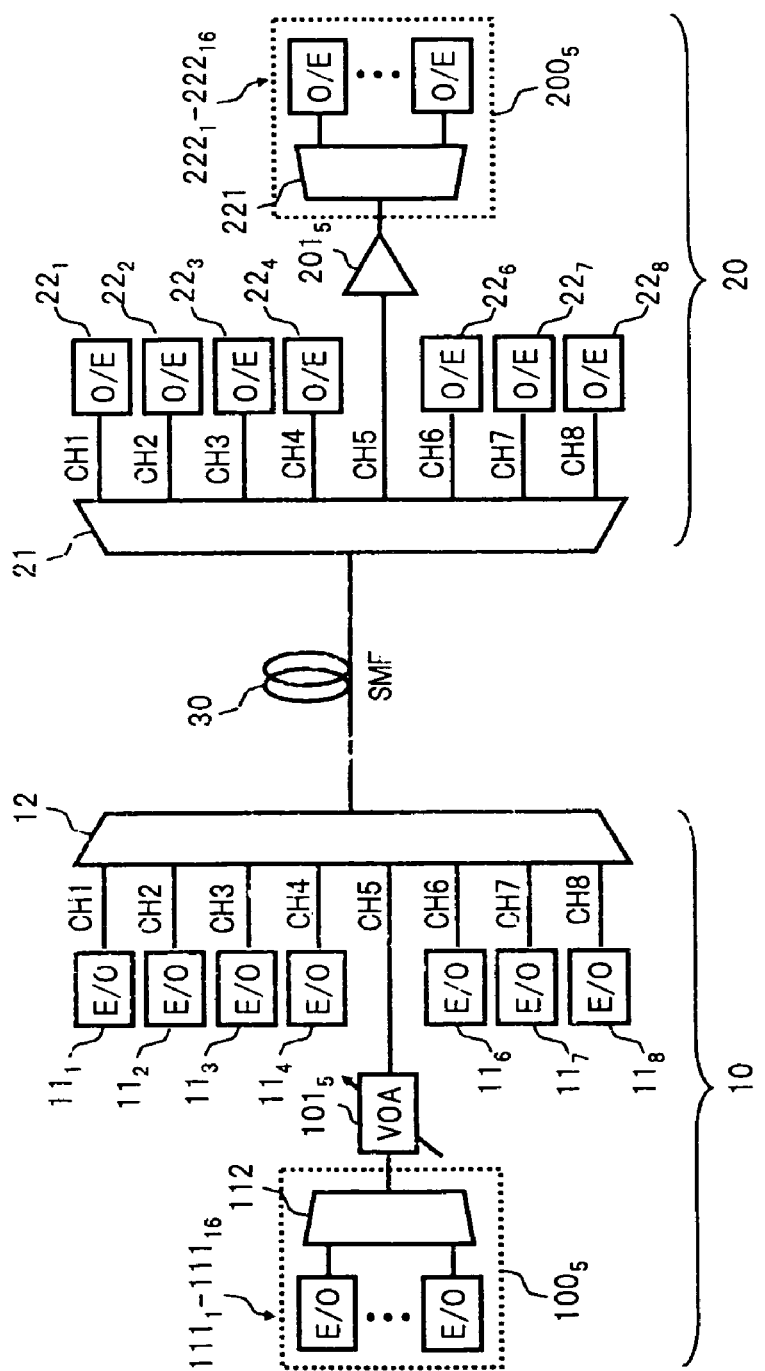
FIG. 1 is a diagram showing a configuration of a CWDM optical transmission system according to a first embodiment of the present invention.

Embodiments of the present invention will be described, with reference to the appended drawings. The same reference numerals denote the same or equivalent parts in all drawings.

FIG. 1 is a diagram showing a configuration of a CWDM optical transmission system according to a first embodiment of the present invention.

In FIG. 1, the CWDM optical transmission system of the present embodiment comprises, for example, an optical transmission terminal 10, and an optical reception terminal 20 connected to the optical transmission terminal 10 via a transmission path 30.

The optical transmission terminal 10 includes: for example, optical transmitters (E/O) $11_1$ through $11_4$, and $11_6$ through $11_8$ generating optical signals CH1 through CH4, and CH6 through CH8 among a plurality (8 waves in this case) of optical signals CH1 through CH8 arranged on a wavelength grid having 20 nm inter-wavelength corresponding to CWDM; a multiplexer 12 having 8 input ports corresponding to the optical signals CH1 through CH8 and one output port; an additional light transmission unit $100_5$ which generates a DWDM light as an additional light in place of the optical signal CH5; and a variable optical attenuator (VOA) $101_5$ inserted between an output port of the additional light transmission unit $100_5$ and the input port, which corresponds to the optical signal CH5, of the multiplexer 12.

The respective optical transmitters $11_1$ through $11_4$, and $11_6$ through $11_8$ are the same as optical transmitters used in a conventional CWDM system. Here, for example, a wavelength of the optical signal CH1 output from the optical transmitter $11_1$ is set to 1470 nm, a wavelength of the optical signal CH2 output from the optical transmitter $11_2$ is set to 1490 nm, a wavelength of the optical signal CH3 output from the optical transmitter $11_3$ is set to 1510 nm, a wavelength of the optical signal CH4 output from the optical transmitter $11_4$ is set to 1530 nm, a wavelength of the optical signal CH6 output from the optical transmitter $11_6$ is set to 1570 nm, a wavelength of the optical signal CH7 output from the optical transmitter $11_7$ is set to 1590 nm, and a wavelength of the optical signal CH8 output from the optical transmitter $11_8$ is set to 1610 nm. Note, a wavelength of the optical signal CH5 to be an additional wavelength in the present embodiment, is set to 1550 nm. Furthermore, the optical signal power output from each of the optical transmitters $11_1$ through $11_4$, and $11_6$ through $11_8$ is, as described later, previously adjusted to a required level at which a nonlinear effect does not occur in the transmission path 30.

The multiplexer 12 multiplexes the optical signals given to the input ports corresponding to the optical signals CH1 through CH8, and sends the multiplexed light to the transmission path 30 via one output port. A transmission characteristic of this multiplexer 12 will be described later.

The additional light transmission unit $100_5$ comprises, for example, optical transmitters (E/O) $111_1$ through $111_{16}$ generating a plurality (16 waves in this case, as described later) of optical signals arranged on a wavelength grid having 0.8 nm inter-wavelength, and a multiplexer 112 having 16 input ports corresponding to the optical signals output from the optical transmitters $111_1$ through $111_{16}$, and one output port.

The optical transmitters $111_1$, through $111_{16}$ are the same as optical transmitters used in the existing DWDM systems. Wavelengths of the optical signals output from the optical transmitters $11_1$, through $111_{16}$, are, as described later, set to be within a passband of the input port, which corresponds to the optical signal CH5, of the multiplexer 12. The multiplexer 112 multiplexes the optical signals output from the optical transmitters $111_1$ through $111_{16}$ to generate a DWDM light, and outputs the DWDM light to the variable optical attenuator $101_5$ as an additional light, in place of the optical signal CH5.

The variable optical attenuator $101_5$ is a well-known optical attenuator for variably changing an attenuation amount of input light. The attenuation amount of this variable optical attenuator $101_5$, is, as described in detail later, either previously set or is controlled in accordance with a control signal given from the outside or the like (not shown in figure), so that the total power of the DWDM light sent out from the multiplexer 12 to the transmission path 30 is approximately equal to the power per one wavelength of the optical signals CH1 through CH4, and CH6 through CH8.

The optical reception terminal 20 includes, for example, a demultiplexer 21 having one input port connected to the transmission path 30 and 8 output ports corresponding to the optical signals CH1 through CH8 arranged on the wavelength grid corresponding to CWDM, optical receivers (O/E) $22_1$ through $22_4$, and $22_6$ through $22_8$ receiving optical signals output from the output ports corresponding to the optical signals CH1 through CH4, and CH6 through CH8 in the demultiplexer 21, an optical amplifier $201_5$ connected to the output port, which corresponds to the optical signal CH5, of the demultiplexer 21, and an additional light reception unit $200_5$ receiving the DWDM light output from the optical amplifier $201_5$.

The demultiplexer 21 demultiplexes the wavelength division multiplexed light propagated through the transmission path 30 to be given to the input port thereof, according to a passband corresponding to the optical signals CH1 through CH8, and outputs the respective demultiplexed lights from the corresponding output ports thereof. A transmission characteristic for the wavelength of the multiplexer 12 will be described later.

The optical receivers $22_1$ through $22_4$, and $22_6$ through $22_8$, which are the same as optical receivers used in a conventional CWDM system, receive optical signals output from the output ports corresponding to the optical signals CH1 through CH4, and CH6 through CH8 in the demultiplexer 21, to perform the data identification processing and the like.

The optical amplifier $201_5$ is a typical optical amplifier, which amplifies the DWDM light output from the output port, which corresponds to the optical signal CH5, of the demultiplexer 21, at the gain according to the attenuation amount of the variable optical attenuator $101_5$ of the optical transmission terminal 10. Note, it is preferable that this optical amplifier $201_5$ is subjected to an automatic gain control (AGC) or an automatic level control (ALC).

The additional light reception unit $200_5$ includes, for example, a demultiplexer 221 having one input port connected to an output port of the optical amplifier $201_5$ and 16 output ports corresponding to a wavelength grid corresponding to DWDM, and optical receivers (O/E) $222_1$ through $222_{16}$ receiving optical signals from the respective output ports of the demultiplexer 221. The demultiplexer 221 demultiplexes the DWDM light output from the demultiplexer 21 via the optical amplifier $201_5$ to be given to the input port thereof, and outputs the optical signals from the corresponding output ports. The optical receivers $222_1$, through $222_{16}$, which are the same as the optical receivers used in the existing DWDM system, receive optical signals output from the output ports of the demultiplexer 221, to perform the data identification processing and the like.

A typical 1.3 μm zero-dispersion single mode fiber (SMF) is used for the transmission path 30.

The addition of the optical signals in the CWDM optical transmission system of the above described configuration will be described.

Firstly, the optical signal wavelength allocation in the present CWDM optical transmission system, and the number of optical signals corresponding to DWDM, which are capable to be added, are described.

Figure 2:
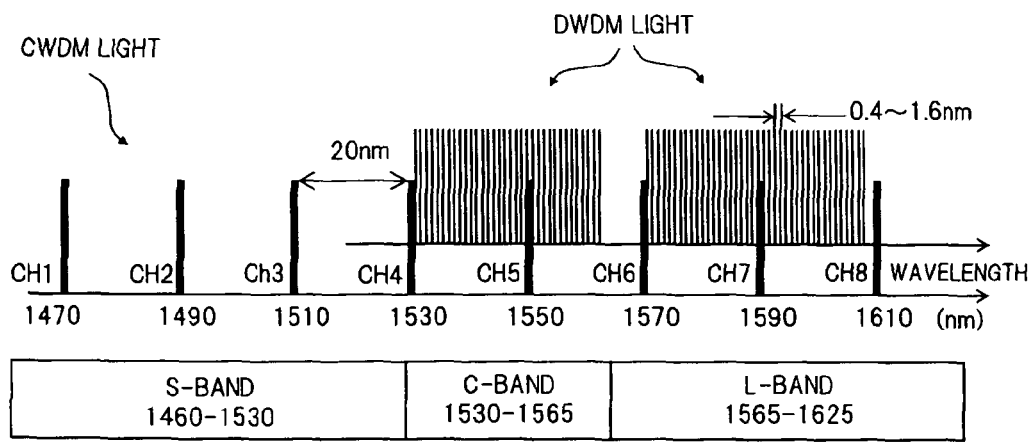
FIG. 2 is a diagram showing an example of typical CWDM/DWDM signal wavelength allocation.

FIG. 2 shows an example of a typical CWDM/DWDM signal wavelength allocation. As shown in FIG. 2, in the CWDM signal wavelength allocation, the inter-wavelength is regulated to 20 nm, and a plurality of optical signals are arranged within a wide wavelength band over the S-band indicating the wavelength band of 1450 nm through 1530 nm, the C-band indicating the wavelength band of 1530 nm through 1565 nm, and the L-band indicating the wavelength band of 1565 nm through 1625 nm. On a typical wavelength grid corresponding to CWDM, optical signals of the wavelengths 1470 nm, 1490 nm, 1510 nm, 1530 nm, 1550 nm, 1570 nm, 1590 nm, and 1610 nm are arranged. Therefore, in the present embodiment, as well, the optical signals CH1 through CH8 of 8 waves are set to correspond to the above described wavelengths, beginning from the short wavelength side. On the other hand, in many cases, in the DWDM signal wavelength allocation, the inter-wavelength is regulated to 0.8 nm (100 GHz) or 0.4 nm (50 GHz) or the like, and a plurality of optical signals are arranged to correspond to the C-band or the L-band, and various types of optical transmission apparatuses for the C-band or the L-band are in practical use.

Figure 3:
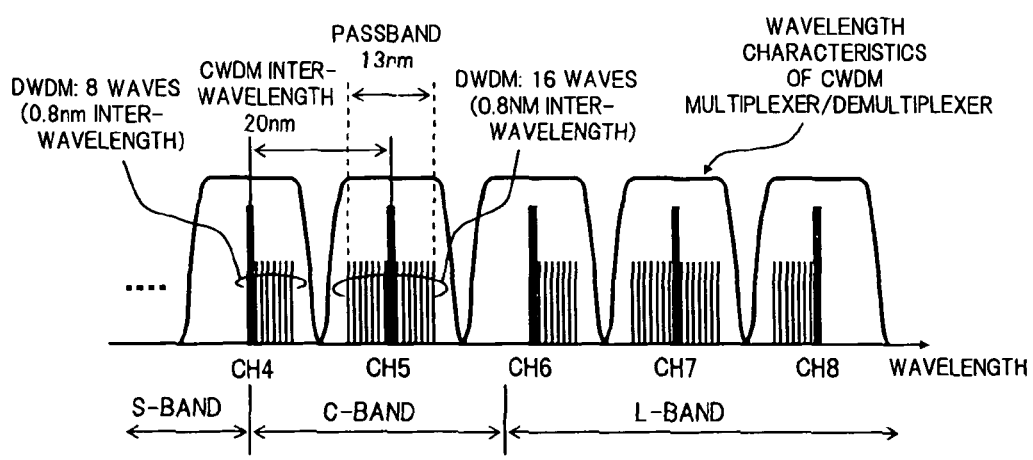
FIG. 3 is a diagram showing an example of transmission characteristic of a CWDM multiplexer/demultiplexer, and the number of signals of DWDM light capable to be added.

When considering that, in the optical transmission system to which the above described typical wavelength allocation corresponding to CWDM is applied, the optical transmission apparatus used in the existing DWDM system is utilized without any modification, to perform the addition of optical signals, the number of DWDM light wavelengths capable to be added is determined according to passbands of the transmission side multiplexer 12 and the reception side demultiplexer 21, which are used in the CWDM optical transmission system. That is to say, as shown in FIG. 3, for example, the above multiplexer 12 and the demultiplexer 21 have the passbands respectively corresponding to the wavelengths of the optical signals for CWDM, and the width of each passband is, for example, approximately 13.0 nm. Accordingly, in place of the optical signal of one wavelength corresponding to CWDM, therefore, the number of wavelengths of optical signals corresponding to DWDM capable to be allocated in the passband is a maximum of 16 waves (0.8 nm×16 waves=12.8 nm) in the case where the optical signals are arranged at the 0.8 nm inter-wavelength, for example.

More specifically, in the case where a C-band optical transmission apparatus used in the existing DWDM system is utilized for the addition, since the optical signals CH4 and CH5 corresponding to CWDM are positioned within the C-band (refer to FIG. 2), the wavelengths thereof can be set as the additional wavelengths. If the optical signal CH5 is set as an additional wavelength, the entire passband, which includes that additional wavelength, of the multiplexer/demultiplexer, is within a signal band of the C-band optical transmission apparatus, and therefore, it is possible to add the optical signals corresponding to DWDM up to 16 waves. If the optical signal CH4 is set as an additional wavelength, approximately half of the passband, which includes that additional wavelength, of the multiplexer/demultiplexer is within the signal band of the C-band optical transmission apparatus, and therefore, it is possible to add the optical signals corresponding to DWDM up to 8 waves. As a result, when both the above optical signals CH4 and CH5 are set as the additional wavelengths, it becomes possible to add a maximum of 24 waves.

Moreover, in the case where an L-band optical transmission apparatus used in the existing DWDM system is utilized for the addition, since the optical signals CH6, CH7, and CH8 corresponding to CWDM are positioned within the L-band (refer to FIG. 2), the wavelengths thereof can be set as the additional wavelengths. If the optical signal CH7 is set as the additional wavelength, the entire passband, which includes that additional wavelength, of the multiplexer/demultiplexer is within a signal band of the L-band optical transmission apparatus, and therefore, it is possible to add the optical signals corresponding to DWDM up to 16 waves. If the optical signal CH6 or CH8 is set as the additional wavelength, approximately half of the passband, which includes that additional wavelength, of the multiplexer/demultiplexer is within the signal band of the L-band optical transmission apparatus, and therefore, it is possible to add the optical signals corresponding to DWDM up to 8 waves. As a result, when the above optical signals CH6, CH7 and CH8 are all set as the additional wavelengths, it is possible to add the optical signals of 32 waves at a maximum. Of course, the existing C-band and L-band optical transmission apparatuses may be combined with each other, and then, it is possible to further add the many optical signal wavelengths. Furthermore, if the inter-wavelength of the optical signals corresponding to DWDM is set to 0.4 nm (50 GHz), the signals capable to be added can be set to twice the above number.

In the configuration of the first embodiment shown in FIG. 1, since the optical signals corresponding to DWDM are added in place of the optical signal CH5, the additional light transmission unit $100_5$ and the variable optical attenuator $101_5$, as well as the additional light reception unit $200_5$ and the optical amplifier $201_5$, can utilize the existing C-band optical transmission apparatus, and therefore, it is possible to add a maximum of 16 waves. The number of signals in the entire CWDM optical transmission system is 23 waves (optical signals CH1 through CH4, and CH6 through CH8, and the added DWDM light of 16 waves).

In the case where the optical signals of 16 waves generated in the optical transmission unit used in the existing DWDM system are given to the CWDM optical transmission system, in place of the one wavelength optical signal CH5, without consideration of the light power during fiber transmission as with the conventional technology, since the total power of the DWDM light of 16 waves is much greater than the power of the optical signal CH5, there is a high possibility that the power of the light sent out to the transmission path will exceed the level at which the nonlinear effect occurs. In this embodiment, therefore, the variable optical attenuator $101_5$ is disposed in the output stage of the additional light transmission unit $100_5$, and the attenuation amount of the variable optical attenuator $101_5$ is adjusted so that the total power of the DWDM light sent out to the transmission path 30 from the multiplexer 12 is approximately equal to the power per one wavelength of the optical signals CH1 through CH4, and CH6 through CH8 corresponding to CWDM.

Figure 4:
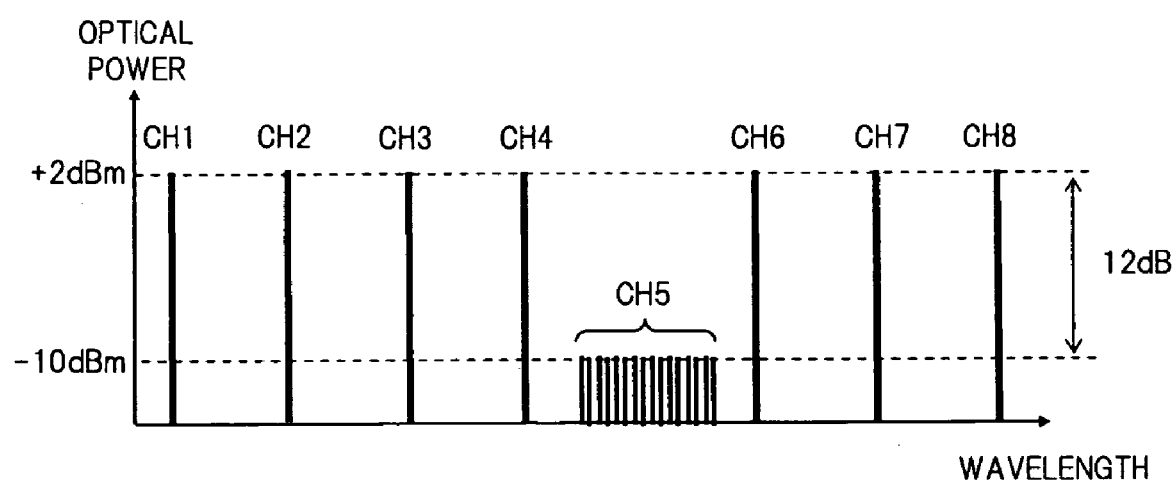
FIG. 4 is a diagram showing an example of the power of each optical signal during transmission in the first embodiment.

FIG. 4 is a diagram showing an example of the power of each optical signal during transmission in the first embodiment. In FIG. 4, in the case where the power of the optical signals CH1 through CH4, and CH6 through CH8 sent out to the transmission path 30 is set to +2 dBm/ch, the attenuation amount of the variable optical attenuator $101_5$ is adjusted so that the power per one wavelength of the DWDM light of 16 waves becomes −10 dBm/ch. The attenuation amount of the variable optical attenuator $101_5$ is obtained with 10·log (number of additional wavelengths), to be 10·log (16)=12 dB in this case. As a result, since the total power of the light sent out from the multiplexer 12 to the transmission path 30 is of the same level as that when only the optical signals CH1 through CH8 corresponding to CWDM are multiplexed to be sent out to the transmission path 30, a situation in which the nonlinear effect occurs in the optical signals propagated through the transmission path 30 can be avoided.

The added light whose power during transmission is suppressed to be low is propagated through the transmission path 30, and at the time when it is received at the optical reception terminal 20, the power thereof becomes very small in comparison with that of each of the optical signals CH1 through CH4, and CH6 through CH8 corresponding to CWDM. Accordingly, in such a condition, it becomes hard to perform the data identification processing and the like in the additional light reception unit $200_5$. Therefore, in the present embodiment, the optical amplifier $201_5$ is connected to the output port, which corresponds to the additional wavelengths, of the demultiplexer 21 of the optical reception terminal 20, and the DWDM light branched by the demultiplexer 21 is amplified at the gain according to the attenuation amount of the variable optical attenuator $101_5$ on the transmission end. As a result, since the total power of the DWDM light given to the additional light reception unit $200_5$ is compensated to the same level as in the optical reception unit used in the existing DWDM system, the reception processing becomes possible in each of the optical receivers $222_1$ through $222_{16}$ within the additional light reception unit $200_5$.

The transmission characteristic of the additional light in the CWDM optical transmission system will be described in detail with reference to a specific example.

In the present CWDM optical transmission system, assuming of the example shown in FIG. 4, the DWDM light of a maximum of 16 waves, which is output from the additional light transmission unit $100_5$ to be sent out to the transmission path 30 via the variable optical attenuator $101_5$ and the multiplexer 12, has the power per one wavelength of −10 dBm/ch, and the total power for 16 waves of +2 dBm/ch. Assuming that, for example, the SMF having the total length of 50 km and a transmission loss of 20 dB, is used for the transmission path 30, the DWDM light of 16 waves reaching the optical reception terminal 20 has the total power of −18 dBm/ch and the power per one wavelength of −30 dBm/ch. Moreover, when the DWDM light passes through the demultiplexer 21, a loss of approximately 4 dB occurs, and the power of the DWDM light input to the optical amplifier $201_5$ is −34 dB/ch per one wavelength.

Here, assuming of the noise figure (NF) of the optical amplifier $201_5$ as 5 dB, an optical signal to noise ratio (OSNR) in the DWDM light output from the optical amplifier $201_5$ is calculated based on the following equation.

OSNR=(input power)−NF+57.9=−34 dBm/ch−5 dB+57.9=18.9 dB

In the above equation, a third term is a constant corresponding to the C-band. Thus, since the OSNR of approximately 19 dB is ensured in the optical signals of respective wavelengths contained in the DWDM light output from the optical amplifier $201_5$, it becomes possible to perform the sufficient reception processing in the optical receivers $222_1$ through $222_{16}$ within the additional light reception unit $200_5$.

As described in the above, according to the CWDM optical transmission system of the first embodiment, since the existing optical transmission apparatus used in the DWDM system is utilized without any modification, it is possible to avoid the reduction in signal quality while achieving the advantage of low-cost, thereby enabling the addition of optical signals. As a result, it becomes possible to provide, at low-cost, an optical communication service exceeding the maximum number of signals capable to be transmitted (8 waves) in the conventional CWDM system.

Next, a second embodiment of the present invention will be described.

Figure 5:
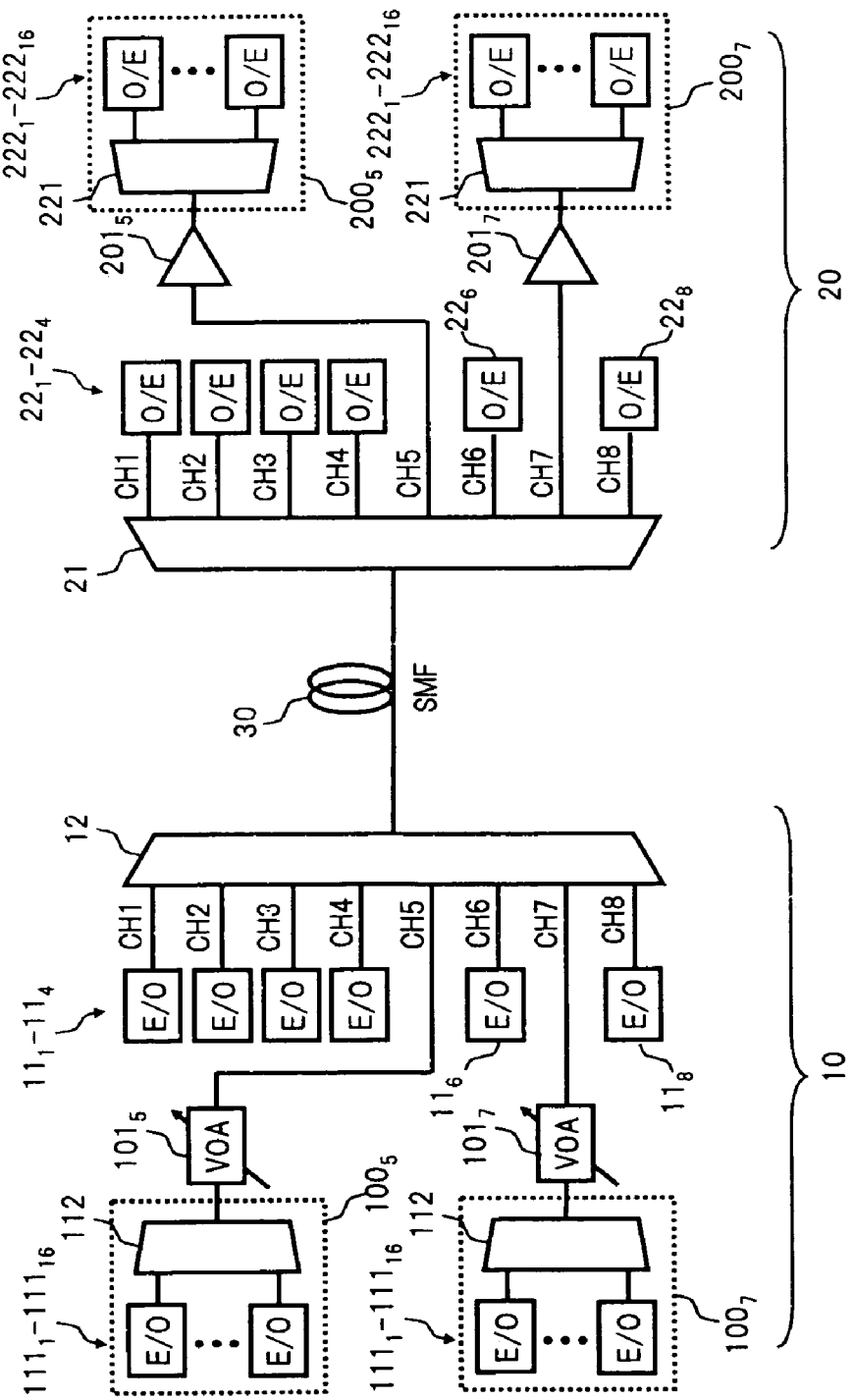
FIG. 5 is a diagram showing a configuration of a CWDM optical transmission system according to a second embodiment of the present invention.

FIG. 5 is a diagram showing a configuration of a CWDM optical transmission system of the second embodiment.

The CWDM optical transmission system shown in FIG. 5 is configured such that, in the configuration of the first embodiment, in addition to the wavelength of the optical signal CH5, the wavelength of the optical signal CH7 is set as the additional wavelength, and the L-band optical transmission apparatus used in the existing DWDM system is also utilized to increase the number of signals capable to be added. More specifically, an additional light transmission unit $100_7$ and a variable optical attenuator $101_7$ are provided in the optical transmission terminal 10, in place of the optical transmitter $11_7$ used in the first embodiment, and the power of a DWDM light output from the additional light transmission unit $100_7$ is adjusted by the variable optical attenuator $101_7$ and thereafter, given to the input port, which corresponds to the optical signal CH7, of the multiplexer 12. Furthermore, an additional light reception unit $200_7$ and an optical amplifier $201_7$ are provided in the optical reception terminal 20, in place of the optical transmitter $22_7$ used in the first embodiment, and the DWDM light output from the output port, which corresponds to the optical signal CH7, of the demultiplexer 21 is amplified by the optical amplifier $201_7$ and thereafter, given to the additional light reception unit $200_7$. The structures of the additional light transmission unit $100_7$ and the variable optical attenuator $101_7$, and the additional light reception unit $200_7$ and optical amplifier $201_7$ are basically similar to the structures of the additional light reception unit $100_5$ and the variable optical attenuator $101_5$, and the additional light reception unit $200_5$ and the optical amplifier $201_5$, with each signal wavelength band thereof shifted from the C-band to the L-band. Therefore, the specific description thereof is omitted here.

Figure 6:
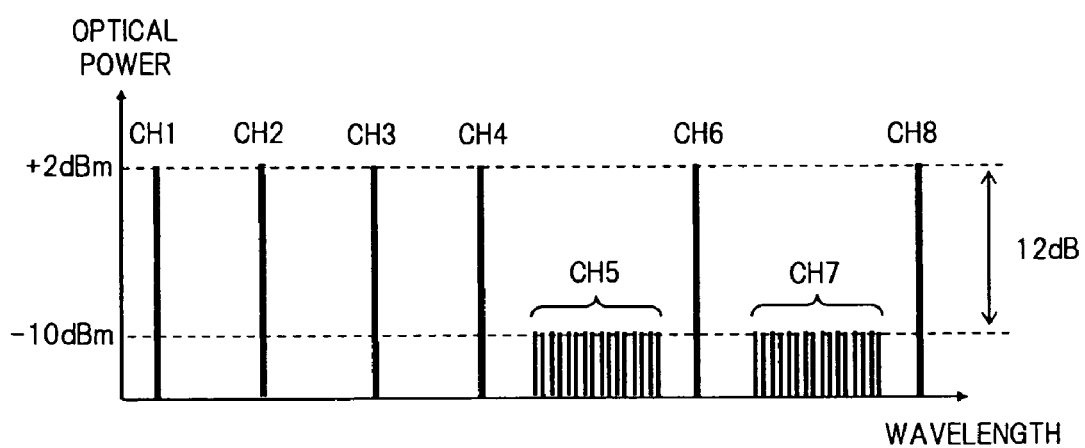
FIG. 6 is a diagram showing an example of the power of each optical signal during transmission in the second embodiment.

In the CWDM optical transmission system of the above described configuration, the optical signal CH7 positioned within the L-band is set as the additional wavelength, as in the wavelength allocation of the optical signals shown in FIG. 6, and thus, for example, the optical signals of a maximum of 16 waves can be arranged at the 0.8 nm inter-wavelength within the passband corresponding to the multiplexer 12 and the demultiplexer 21 (refer to FIG. 3). In the case where, in place of the optical signal CH7 corresponding to CWDM, the DWDM light of 16 waves in the L-band are transmitted under the same conditions as the DWDM light in the C-band corresponding to the above described optical signal CH5, an OSNR of the DWDM light output from the optical amplifier $201_7$ in the optical reception terminal 20 is calculated based on the following equation.

OSNR=(input power)−NF+58.3=−34 dBm/ch−5 dB+58.3=19.3 dB

In the above equation, a third term is a constant corresponding to the L-band. Thus, since the OSNR of 19 dB or greater can also be ensured for the L-band DWDM light in place of the optical signal CH7, it becomes possible to perform the sufficient reception processing in the additional light reception unit $200_7$.

Therefore, according to the second embodiment, the optical signals of a maximum of 32 waves can be added by utilizing the C-band and L-band optical transmission apparatuses used in the existing DWDM system, and therefore, it becomes possible to add the number of signals in the entire CWDM optical transmission system up to a maximum of 38 waves by combining the optical signals CH1 through CH4, CH6 and CH8 with the added DWDM light of 32 waves.

Next, a third embodiment of the present invention will be described.

Figure 7:
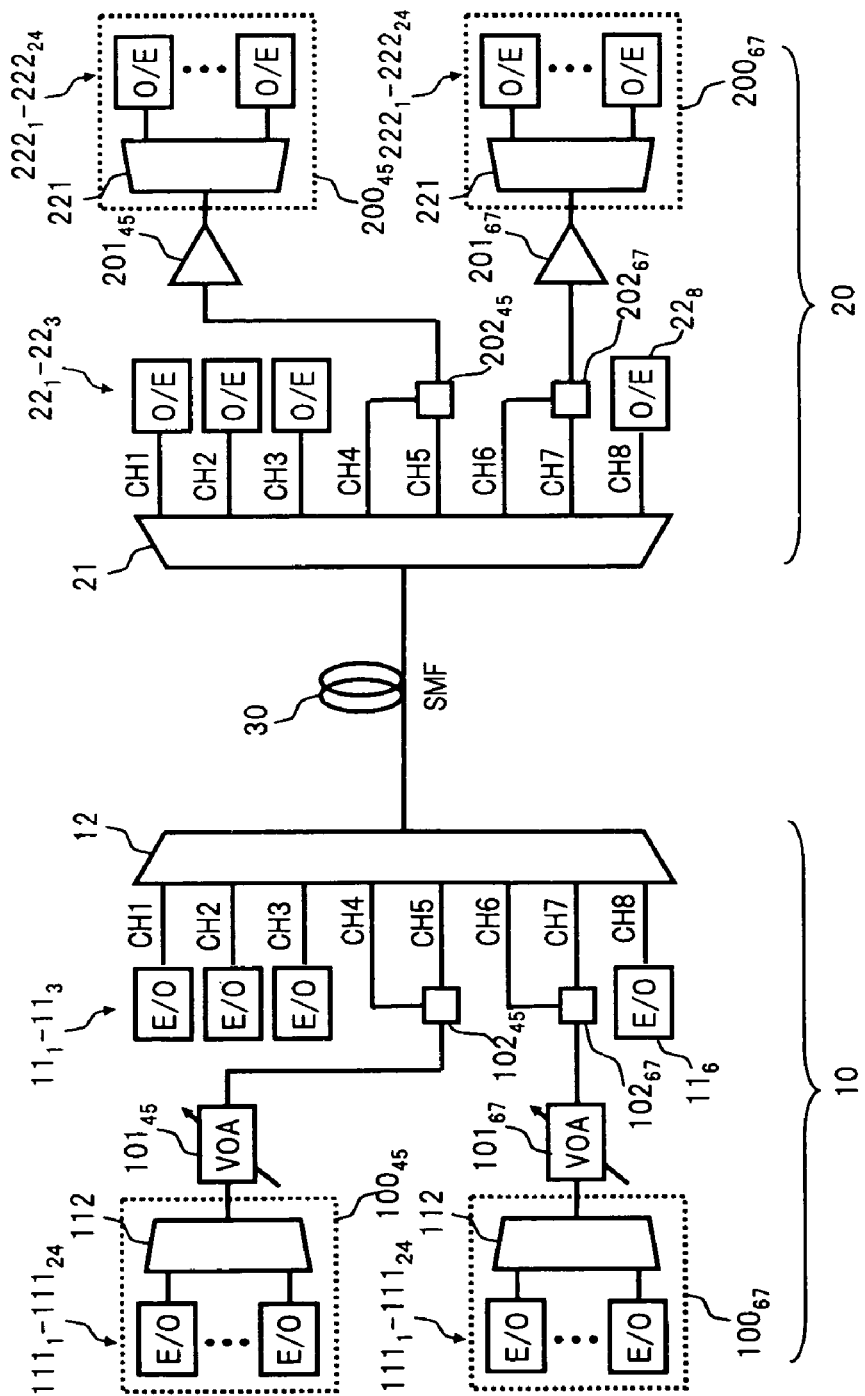
FIG. 7 is a diagram showing a configuration of a CWDM optical transmission system according to a third embodiment of the present invention.

FIG. 7 is a diagram showing a configuration of a CWDM optical transmission system of the third embodiment.

The CWDM optical transmission system shown in FIG. 7 is configured such that, in the configuration of the second embodiment, in addition to the wavelengths of the optical signals CH5 and CH7, the wavelengths of the optical signals CH4 and CH6 are also set as the additional wavelengths, and the C-band and L-band optical transmission apparatuses used in the existing DWDM system are also utilized to further increase the number of signals capable to be added.

More specifically, in the optical transmission terminal 10, there is provided; an additional light transmission unit $100_{45}$ which generates a DWDM light as the additional light in place of the optical signals CH4 and CH5, a variable optical attenuator $101_{45}$ which adjusts the total power of the DWDM light, and a demultiplexer $102_{45}$ which demultiplexes the DWDM light passed through the variable optical attenuator $101_{45}$ into a component corresponding to the optical signal CH4 and a component corresponding to the optical signal CH5, to output these components to the respective input port of the multiplexer 12. Moreover, there is provided; an additional light transmission unit $100_{67}$ which generates a DWDM light as the additional light in place of the optical signals CH6 and CH7, a variable optical attenuator $101_{67}$ which adjusts the total power of the DWDM light, and a demultiplexer $102_{67}$ which demultiplexes the DWDM light passed through the variable optical attenuator $101_{67}$ into a component corresponding to the optical signal CH6 and a component corresponding to the optical signal CH7, to output these components to the respective input port of the multiplexer 12.

In the optical reception terminal 20, there is provided; a multiplexer $202_{45}$ which multiplexes DWDM lights output from the output ports, which correspond to the optical signals CH4 and CH5, of the demultiplexer 21, an optical amplifier $201_{45}$ which amplifies the DWDM light output from the multiplexer $202_{45}$, and an additional light reception unit $200_{45}$ which performs the reception processing of the DWDM light output from the receiving optical amplifier $201_{45}$. Furthermore, there is provided; a multiplexer $202_{67}$ which multiplexes DWDM lights output from the output ports, which correspond to the optical signals CH6 and CH7, of the demultiplexer 21, an optical amplifier $201_{67}$ which amplifies the DWDM light output from the multiplexer $202_{67}$, and an additional light reception unit $200_{67}$ which performs the reception processing of the DWDM light output from the optical amplifier $201_{67}$.

Figure 8:
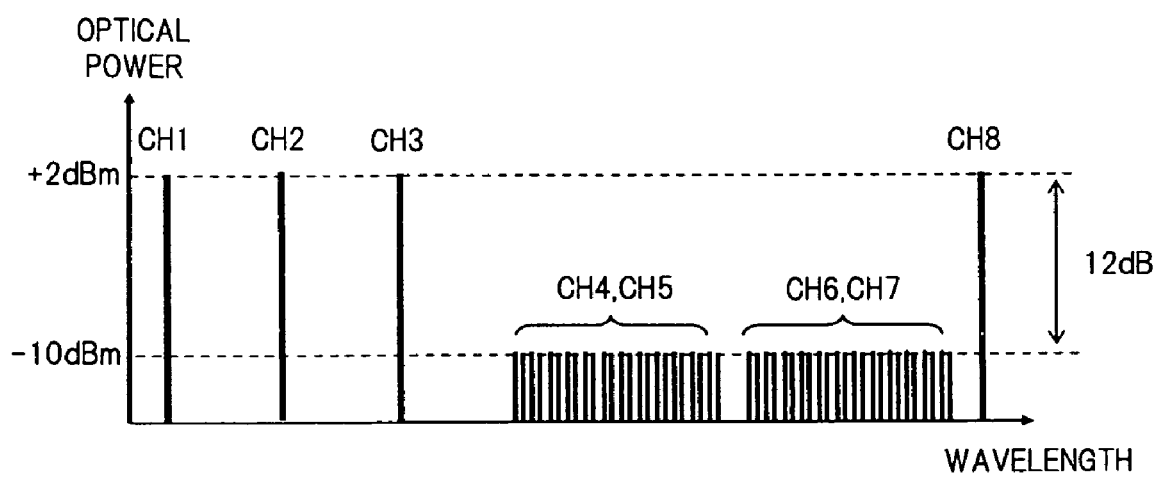
FIG. 8 is a diagram showing an example of the power of each optical signal during transmission in the third embodiment.

In the CWDM optical transmission system of the above described configuration, the optical signal CH4 positioned within the C-band is set as the additional wavelength, as in the wavelength allocation of the optical signals shown in FIG. 8, and thus, for example, the optical signals of a maximum of 8 waves can be arranged at the 0.8 nm inter-wavelength within the passband corresponding to the multiplexer 12 and the demultiplexer 21 (refer to FIG. 3), and the DWDM light containing the optical signals of a maximum of 24 waves can be added for the C-band in combination with the optical signals of a maximum of the 16 waves capable to be arranged within the passband corresponding to the optical signal CH5 positioned within the same C-band. Moreover, in the same manner, by setting the optical signal CH6 positioned within the L-band as the additional wavelength, the optical signals of a maximum of 8 waves can be arranged within the passband corresponding to the multiplexer 12 and the demultiplexer 21, and the DWDM light containing the optical signals of a maximum of 24 waves can be added for the L-band in combination with the optical signals of a maximum of 16 waves capable to be arranged within the passband corresponding to the optical signal CH7 positioned within the same L-band. As with the second embodiment, since an OSNR of approximately 19 dB can be ensured for this additional light with an output of the optical amplifier $201_{67}$, it is possible to perform the sufficient reception processing in the additional light reception unit $200_7$.

Therefore, according to the third embodiment, the optical signals of a maximum of 48 waves can be added by utilizing the C-band and L-band optical transmission apparatuses used in the existing DWDM system, and therefore, it becomes possible to increase the number of signals in the entire CWDM optical transmission system up to a maximum of 52 waves by combining the optical signals CH1 through CH3 and CH8 with the added DWDM light of 52 waves.

In the above third embodiment, the wavelengths of the optical signals CH6 and CH7 are set as the additional wavelengths for the L-band. However, in addition to this combination, it is also possible to set the combination of CH7 and CH8, the combination of CH6 and CH8, or the combination of CH6, CH7 and CH8.

Next, a fourth embodiment of the present invention will be described.

In the above first through third embodiments, the configuration has been shown in the case where the 1.3 μm zero-dispersion single mode fiber is used for the transmission path 30. In the fourth embodiment, the description is made on a case where a dispersion-shifted fiber (DSF) whose zero-dispersion wavelength is shifted to 1.5 μm is used for the transmission path 30.

Figure 9:
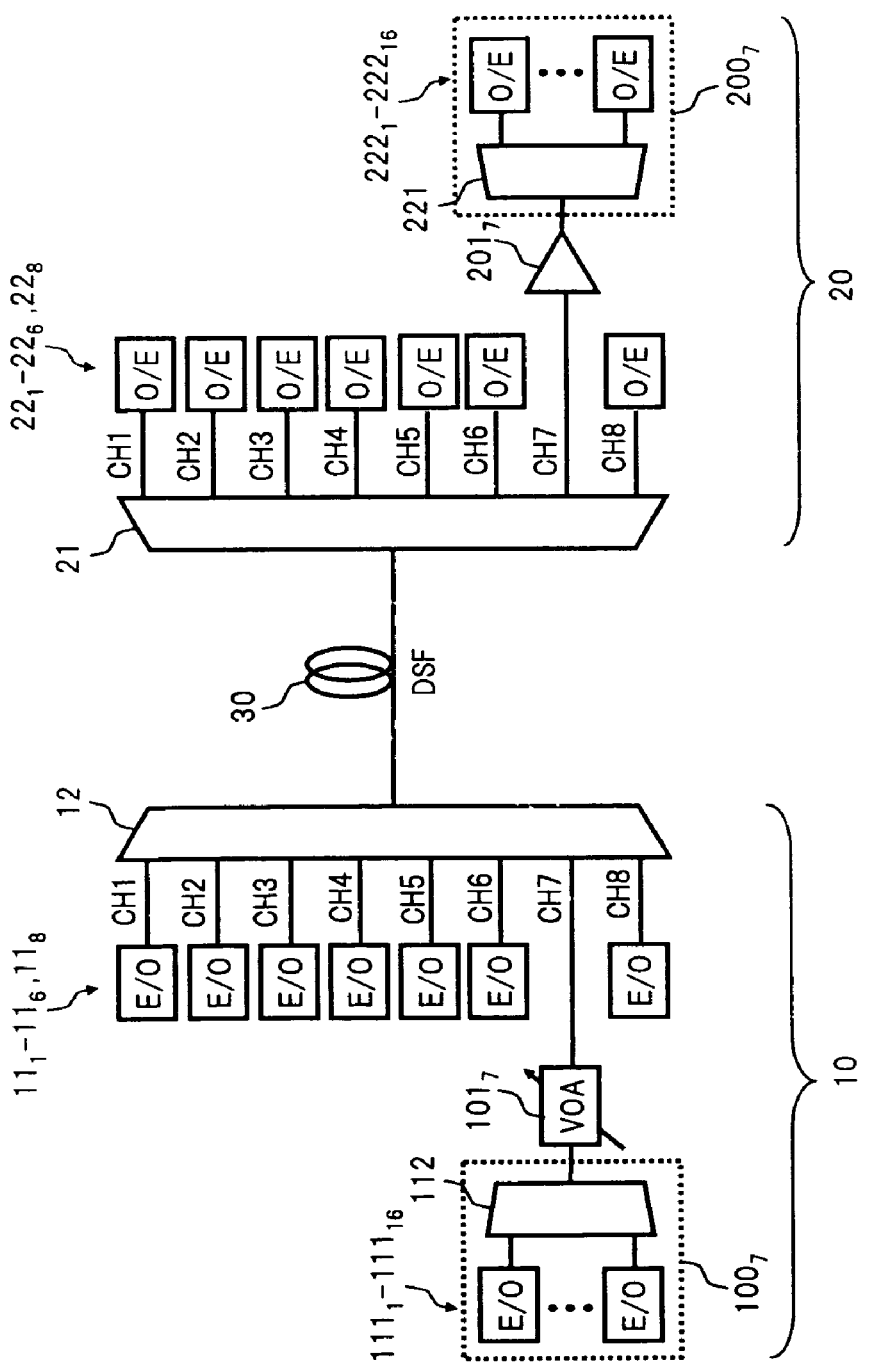
FIG. 9 is a diagram showing a configuration of a CWDM optical transmission system according to a fourth embodiment of the present invention.

FIG. 9 is a diagram showing a configuration of a CWDM optical transmission system of the fourth embodiment.

Figure 10:
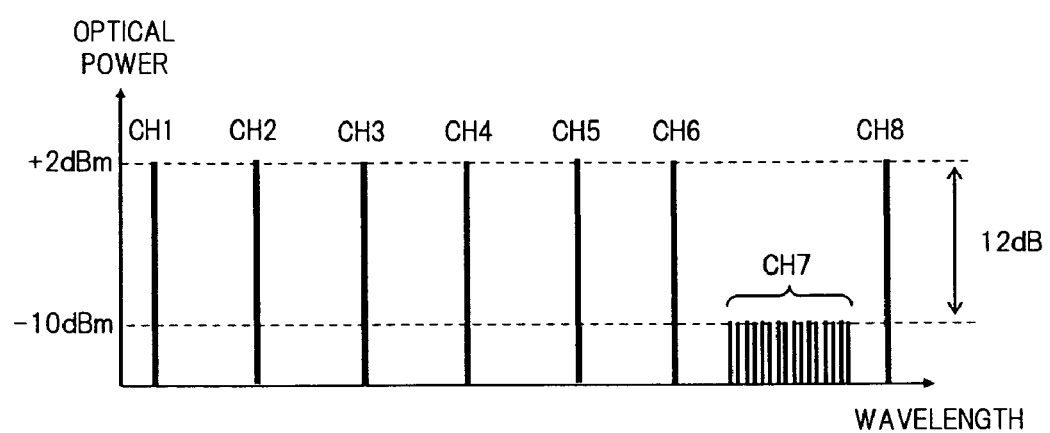
FIG. 10 is a diagram showing an example of the power of each optical signal during transmission in the fourth embodiment.

As shown in FIG. 9, in the case where the dispersion-shifted fiber is used for the transmission path 30 to transmit the optical signals, which are wavelength division multiplexed, there is a possibility that four-wave mixing (FWM) occurs in the DWDM light of the C-band, resulting in the reduction in transmission quality. Therefore, in order to utilize the optical transmission apparatus used in the existing DWDM system, to add the signal light wavelengths at low-cost, it is effective to set the optical signals CH6 through CH8 within the L-band as the additional wavelengths. Therefore, in the present embodiment, for example, the optical signal CH7 is set as the additional wavelength, the additional light transmission unit $100_7$ and the variable optical attenuator $101_7$ are provided in the optical transmission terminal 10, and the additional light reception unit $200_7$ and the optical amplifier $201_7$ are provided in the optical reception terminal 20, corresponding to the optical signal CH7. The additional light transmission unit $100_7$ and the variable optical attenuator $101_7$, and the additional light reception unit $200_7$ and the optical amplifier $201_7$, are the same as those used in the second embodiment, and in the case where the inter-wavelength of the optical signals corresponding to DWDM is set to, for example, 0.8 nm, the optical signals of a maximum of 16 waves can be added, as shown in the optical signal wavelength allocation in FIG. 10. By setting the additional wavelength within the L-band, in the CWDM optical transmission system using the dispersion-shifted fiber for the transmission path 30, it is possible to achieve the same effect as in the first embodiment.

Figure 11:
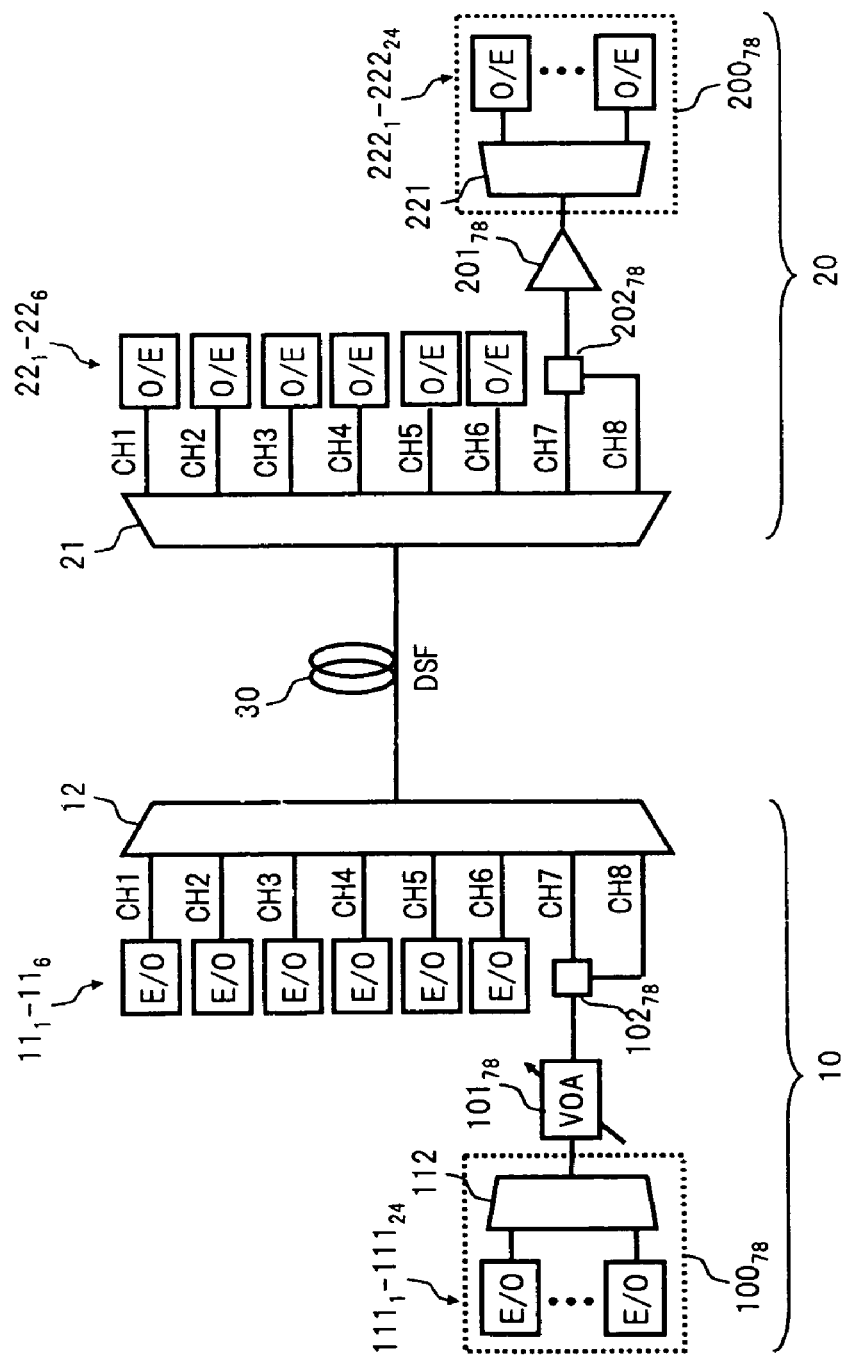
FIG. 11 is a diagram showing a further configuration of the CWDM optical transmission system relating to the fourth embodiment of the present invention.
Figure 12:
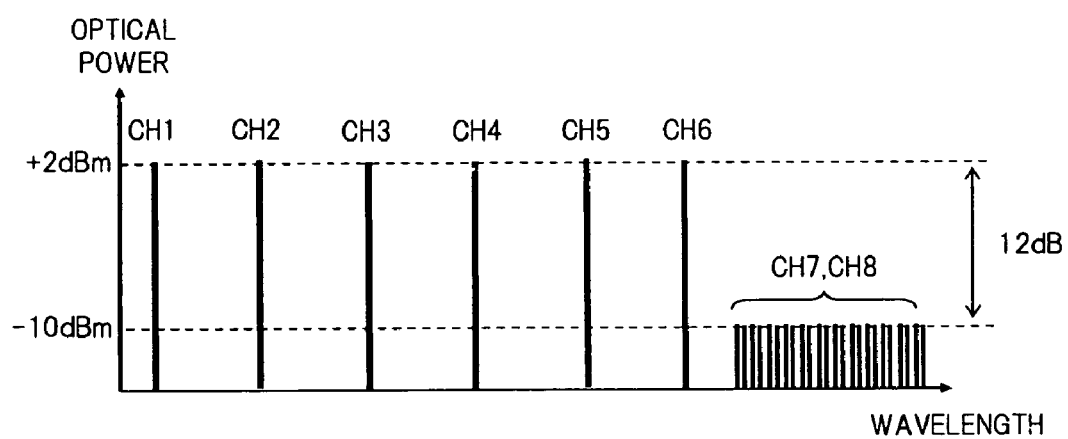
FIG. 12 is a diagram showing an example of the power of each optical signal during transmission in the CWDM optical transmission system in FIG. 11.

In the fourth embodiment, the example has been shown in which the optical signal CH7 within the L-band is set as the additional wavelength is shown. However, the additional wavelength when the dispersion-shifted fiber is used, is not limited to this, and it is possible to set the optical signals CH7 and CH8 as the additional wavelengths as shown in the configuration diagram in FIG. 11 and the wavelength allocation diagram in FIG. 12. Surely, either the optical signal CH6 or the optical signal CH8 may be set as the additional wavelength in place of the optical signal CH7, or a combination of any two or all of the optical signals CH6 through CH8 may be set as the additional wavelengths.

Next, a fifth embodiment of the present invention will be described.

In the fifth embodiment, the description is made on an application example to a CWDM optical transmission system in which optical signals are transmitted in bi-directions using a single-core 1.3 μm SMF.

Figure 13:
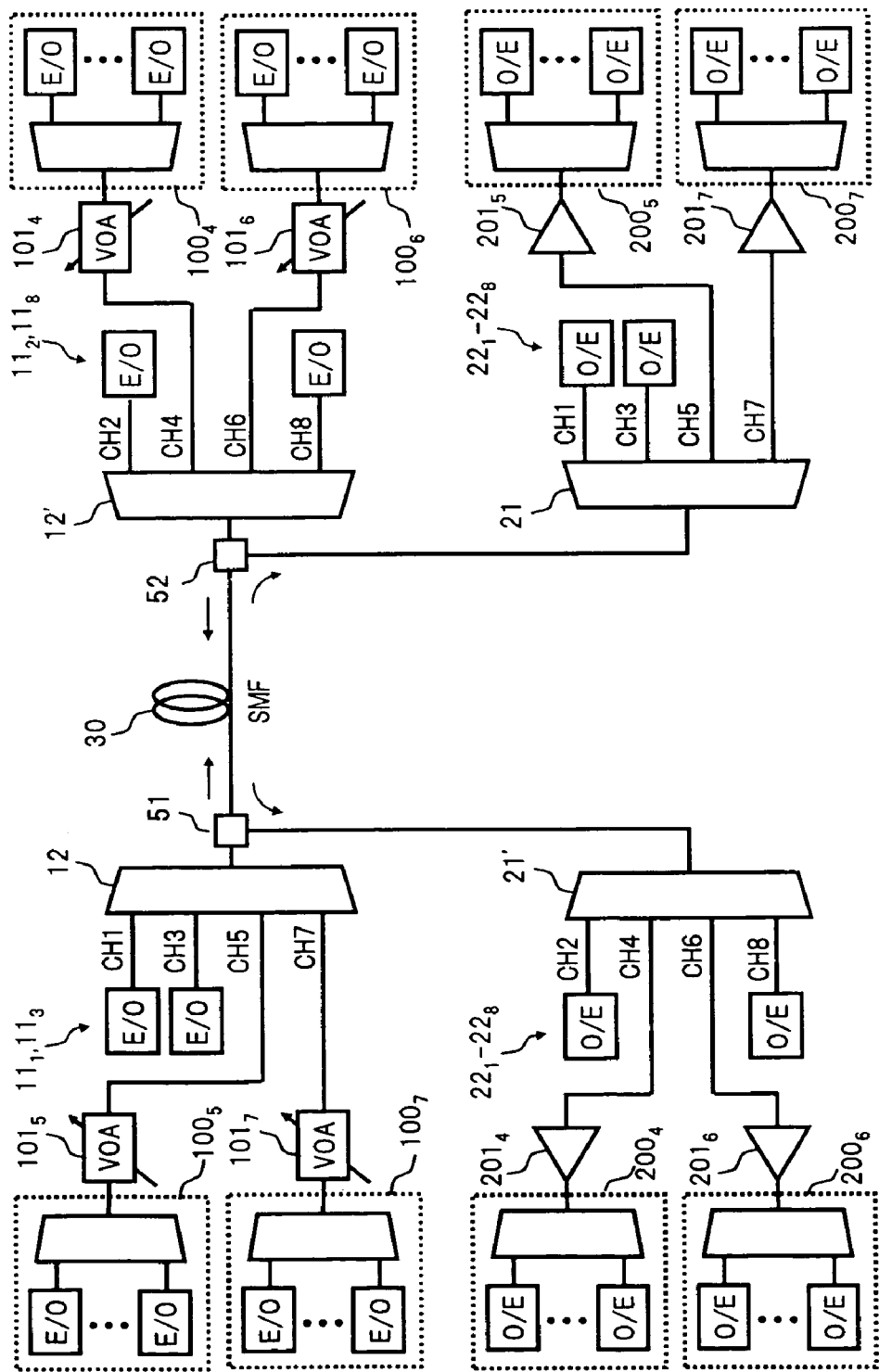
FIG. 13 is a diagram showing a configuration of a CWDM optical transmission system according to a fifth embodiment of the present invention.

FIG. 13 is a diagram showing a configuration of a CWDM optical transmission system of the fifth embodiment.

In the configuration shown in FIG. 13, in a bi-directional CWDM optical transmission system in which, among the optical signals CH1 through CH8 of 8 waves on the wavelength grid corresponding to CWDM, the optical signals CH1, CH3, CH5 and CH7 having odd-numbered wavelength numbers are transmit on the uplink, and the optical signals CH2, CH4, CH6 and CH8 having even-numbered wavelength numbers are transmit on the downlink, the optical signals CH5 and CH7 on the uplink side and the optical signals CH4 and CH6 on the downlink side are set as additional wavelengths respectively. As with each of the above embodiments, an additional light transmission unit $100_i$ and a variable optical attenuator $101_i$, as well as an additional light reception unit $200_i$ and an optical amplifier $201_i$ (where i=4 through 7), are respectively provided corresponding to the respective additional wavelengths. A multiplexer/demultiplexer 51 provided in the vicinity of one end of the transmission path 30 sends the optical signals CH1 and CH3, and the DWDM lights respectively corresponding to the optical signals CH5 and CH7, which are output from the multiplexer 12 on the uplink side, to the transmission path 30, and conversely, transmits the optical signals CH2 and CH8, and the DWDM lights corresponding to the optical signals CH4 and CH6, which have been propagated through the transmission path 30, to a demultiplexer 21' on the downlink side. Furthermore, a multiplexer/demultiplexer 52 provided in the vicinity to the other end of the transmission path 30 sends the optical signals CH2 and CH8, and the DWDM lights corresponding to the optical signals CH4 and CH6, which are output from a multiplexer 12' on the downlink side, to the transmission path 30, and conversely, transmits the optical signals CH1 and CH3, and the DWDM lights corresponding to the optical signals CH5 and CH7, which have been propagated through the transmission path 30, to the demultiplexer 21 on the uplink side.

In the bi-directional CWDM optical transmission system of the above configuration, in the case where for example, the inter-wavelength of the added DWDM light is set to 0.8 nm as shown in FIG. 14, for the uplink, the DWDM light of a maximum of 32 waves can be added with the 16 waves in the C-band corresponding to the optical signal CH5, and 16 waves in the L-band corresponding to the optical signal CH7, and in the downlink, it becomes possible to add the DWDM light of a maximum of 16 waves, with 8 waves in the C-band corresponding to the optical signal CH4, and 8 waves in the L-band corresponding to the optical signal CH6.

In the downlink in the fifth embodiment, it is possible to set the optical signal CH8 as the additional wavelength. Moreover, the allocation of the optical signals CH1 through CH8 of 8 waves to the uplink and downlink is not limited to the above described use of odd and even-numbered wavelengths, and may be allocated in accordance with an arbitrary rule.

Next, a sixth embodiment of the present invention will be described.

In the fourth embodiment described above, there has been shown the example in which in the case where the dispersion-shifted fiber (DSF) whose zero-dispersion wavelength is shifted to 1.5 μm is used for the transmission path 30, the optical signals CH6 through CH8 within the L-band are set as the additional wavelengths, considering the occurrence of four wave mixing (FWM) in the DWDM light of the C-band. However, in the case where a small number of wavelengths (for example, up to 4 waves) is added, even in the case of wavelength addition in the C-band, it becomes possible to avoid the degradation due to the crosstalk at the FWM occurrence frequency by arranging optical signals at uneven intervals. Therefore, in the sixth embodiment, there will be described a specific example of the CWDM optical transmission system corresponding to the above case.

Figure 15:
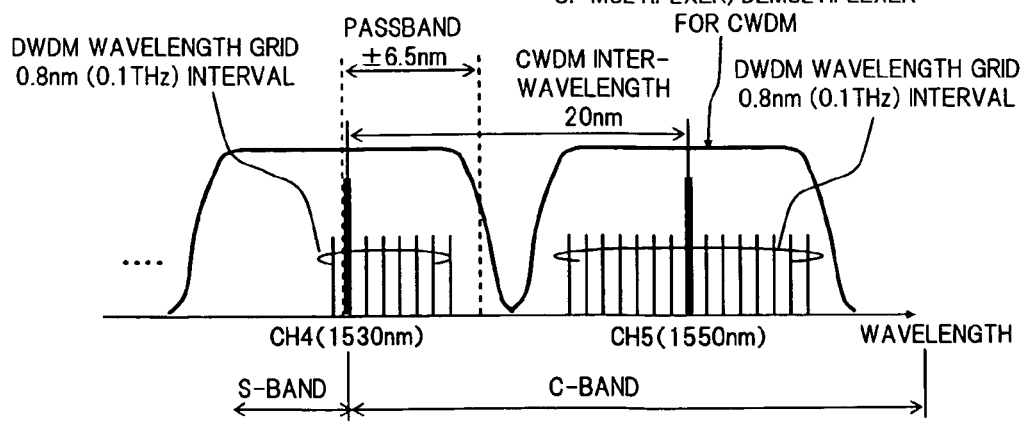
FIG. 15 is a diagram for explaining optical signals corresponding to a DWDM system, which can be arranged in the C-band, in a sixth embodiment of the present invention.

At first, as shown in (A) and (B) of FIG. 15, in the C-band regulated by the ITU-T standard, 15 points (CH1' through CH15') on the wavelength grid corresponding to DWDM exist in 1530 nm±10 nm band in which the optical signal CH4 corresponding to CWDM is arranged, and 25 points (CH16' through CH40') on the wavelength grid corresponding to DWDM exist in 1550 nm±10 nm band in which the optical signal CH5 corresponding to CWDM is arranged. However, since the passband of each of the multiplexer 12 and demultiplexer 21 corresponding to CWDM is narrower than the signal interval for CWDM 20 nm, that is, ±10 nm, it is practically impossible to arrange optical signals on all of the points on the wavelength grid corresponding to DWDM. For example, in the case where the passband of each of the multiplexer 12 and the demultiplexer 21 is ±6.5 nm, in 1530 nm band corresponding to the optical signal CH4 corresponding to CWDM, optical signals corresponding to DWDM can be arranged on 10 grids of from CH1' through CH10' and the frequency band thereof is 900 GHz. Further, in 1550 nm band corresponding to the optical signal CH5 corresponding to CWDM, optical signals corresponding to DWDM can be arranged on 16 grids of from CH20' through CH35' and the frequency band thereof is 1500 GHz.

Here, the consideration will be made on a relative relation between the optical signals corresponding to DWDM and idler lights due to the FWM in the frequency bands of 1530 nm band and 1550 nm band.

Figure 16:
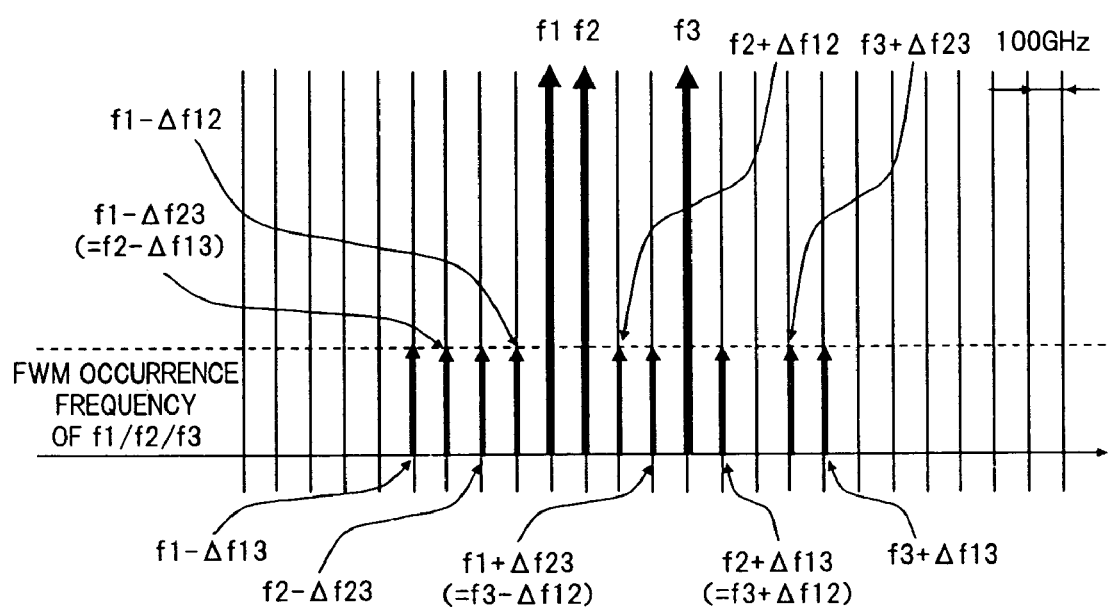
FIG. 16 is a diagram showing frequency points at which idler lights are generated due to the FWM in the case where optical signals of 3 waves are WDM transmitted.

Generally, in the case where optical signals of 3 waves having frequencies f1, f2 and f3 are WDM transmitted, frequency points at which idler lights due to the FWM are generated including frequency points at which idler lights due to degenerate four-wave mixing are generated are shown in FIG. 16, for example. Note, Δf12 in the figure represents an interval between f1 and f2. Similarly, Δf23 represents an interval between f2 and f3, and Δf13 represents an interval between f1 and f3. As shown in the example of FIG. 16, the respective optical signals having frequencies f1 through f3 are arranged at uneven intervals (here, 100 GHz and 300 GHz intervals), so that the frequencies of the optical signals do not overlap with the frequencies at which the idler lights due to the FWM are generated, and as a result, the transmission quality is not degraded due to the occurrence of crosstalk. It is understood from FIG. 16 that the frequency points at which the idler lights are generated are 9 points with regard to the optical signals of 3 waves.

Figure 17:
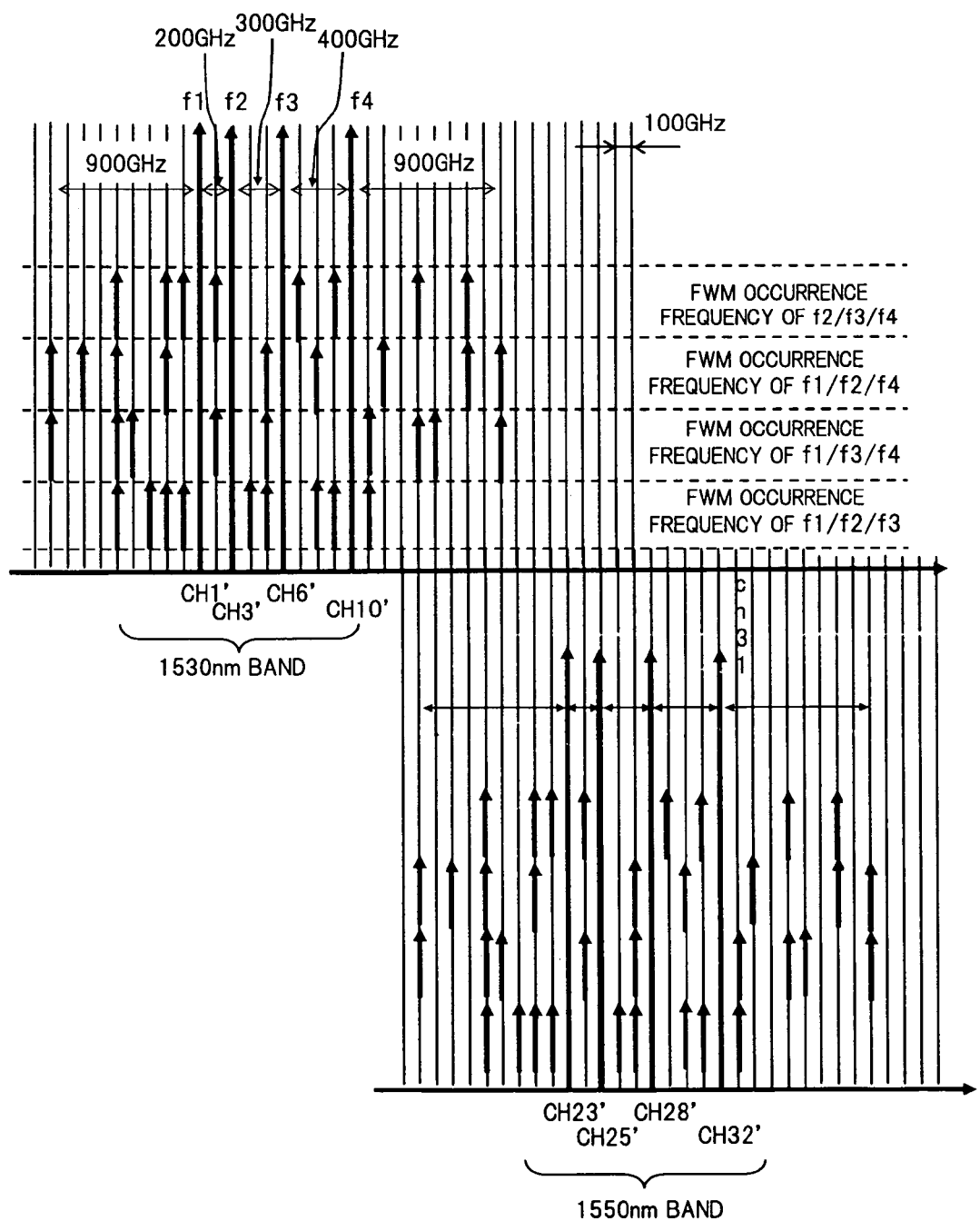
FIG. 17 is a diagram showing frequency points at which idler lights are generated due to the FWM in the case where optical signals of 4 waves are WDM transmitted.

Next, the consideration of the frequency points at which the idler lights due to the FWM are generated will be made extensively on the case where optical signals of 4 waves are WDM transmitted. FIG. 17 shows the consideration result. In FIG. 17, in 1530 nm band shown in the upper part, since the frequency band in which the optical signals corresponding to DWDM can be arranged is 900 GHz as described above, the arrangement intervals of optical signals of 4 waves having frequencies f1 through f4 are 200 GHz, 300 GHz and 400 GHz, for example. To be specific, herein, the optical signals CH1', CH3', CH6' and CH10' each corresponding to DWDM shown in (A) of FIG. 15 are arranged. There exists a plenty of frequency points at which the idler lights due to the FWM are generated, in this uneven interval signal arrangement, as shown in a second through fifth columns on the upper part of FIG. 17. However, it is understood that these frequency points do not overlap with the frequencies of the respective optical signals CH1', CH3', CH6' and CH10'. Further, in addition to the fact that the crosstalk between each optical signal and the idler light due to the FWM does not occur in 1530 nm band, it is also important the fact that the frequency points at which the idler lights due to the FWM are generated do not overlap with the frequencies of the optical signals arranged in 1550 nm band.

In FIG. 17, also in 1550 nm band shown in the lower part, the arrangement intervals of the optical signals of 4 waves are 200 GHz, 300 GHz and 400 GHz, for example. To be specific, herein, the optical signals CH23', CH25', CH28' and CH32' each corresponding to DWDM shown in (A) of FIG. 15 are arranged. It is understood from FIG. 17 that the frequencies of the optical signals arranged in 1550 nm band do not overlap with the frequency points at which the idler lights due to the FWM are generated in 1530 nm band. Further, as well as the frequency points in 1530 nm band, there exist a plenty of frequency points at which the idler lights due to the FWM are generated in 1550 nm band. However, these frequency points do not overlap with the frequencies of the respective optical signals CH23', CH25', CH28' and CH32'. In addition, these frequency points do not overlap with the frequencies of the optical signals CH1', CH3', CH6' and CH10' in 1530 nm band.

Figure 18:
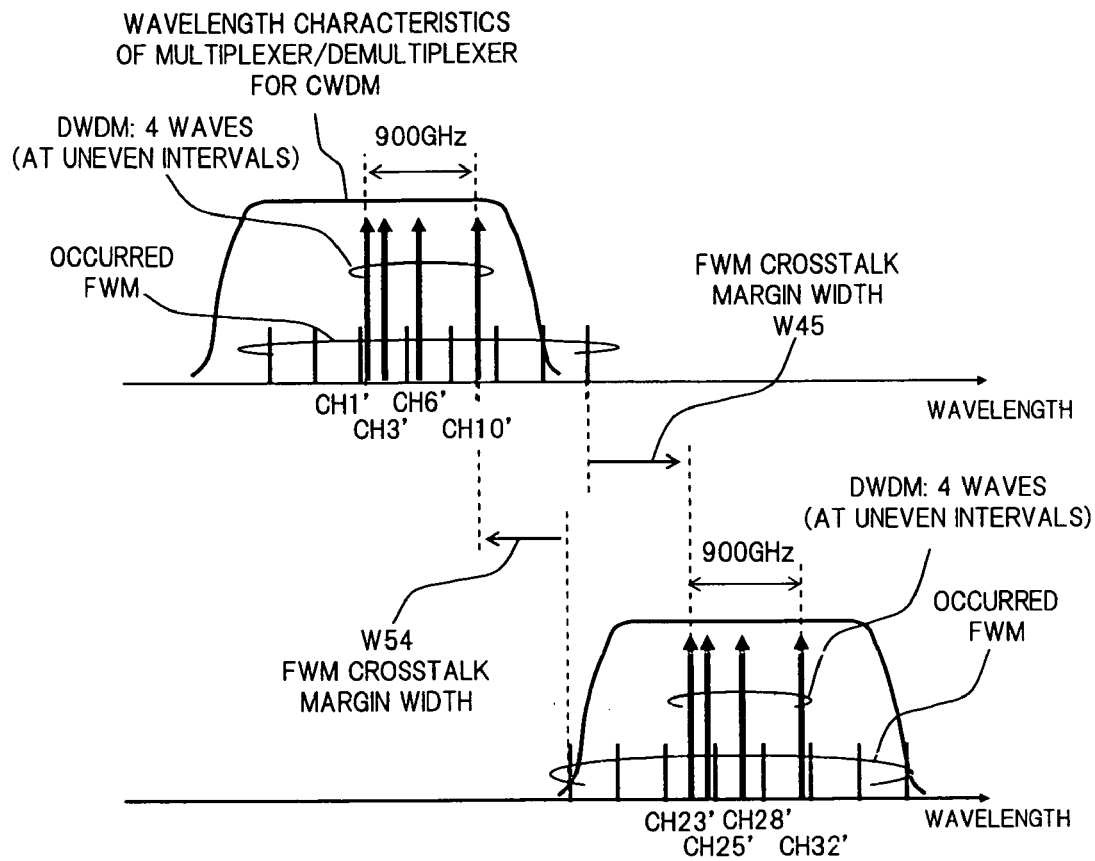
FIG. 18 is a diagram in which a relative relation between optical signals arranged at uneven intervals in 1530 nm band and 1550 nm band, and the idler lights due to the FWM in FIG. 17, is processed.

FIG. 18 is a diagram in which a relative relation between each optical signal arranged at uneven interval in 1530 nm band and 1550 nm band, and the idler light due to the FWM is processed. As shown in the figure, a FWM crosstalk margin width W45 indicating the spacing of from a longest wavelength among the idler lights due to the FWM caused by the optical signals in 1530 nm band to a shortest wavelength among the optical signals in 1550 nm band, and a FWM crosstalk margin width W54 indicating the spacing of from the shortest wavelength among the idler lights due to the FWM caused by the optical signals in 1550 nm band to the longest wavelength among the optical signals in 1530 nm band, need to be set to be respectively n (=integer) times 100 GHz, that is, to be respectively wider than the wavelength grid interval.

As shown in FIG. 17, in the case where the arrangement intervals of the optical signals of 4 waves in 1530 nm band and the arrangement intervals of the optical signals of 4 waves in 1550 nm band, are respectively set to 200 GHz, 300 GHz and 400 GHz, both of the FWM crosstalk margin widths W45 and W54 are 400 GHz. FIG. 19 shows specific optical signal arrangement examples in the case where the arrangement intervals of the optical signals of 4 waves in each of 1530 nm band and 1550 nm band are set to 200 Ghz, 300 Ghz and 400 Ghz. It means that the arrangement of the optical signals of 4 waves at uneven intervals of 200 Ghz, 300 Ghz and 400 Ghz in the present embodiment applies the combination of signal arrangements shown in FIG. 19 is applied.

Figure 20:
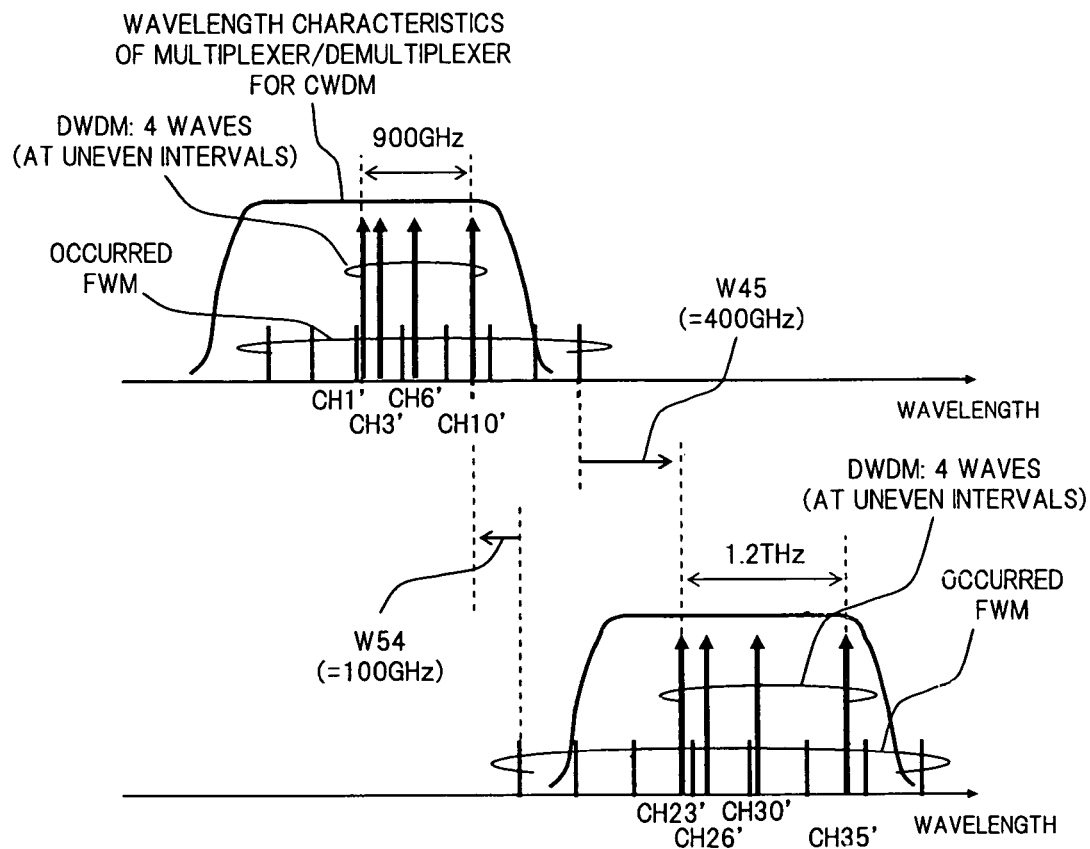
FIG. 20 is a diagram showing specific signal arrangement examples in the case where arrangement intervals of optical signals in 1530 nm band are set at 200 GHz, 300 GHz and 400 GHz, and arrangement intervals of optical signals in 1550 nm band are set at 300 GHz, 400 GHz and 500 GHz.

Further, FIG. 20 is a diagram in which a relative relation between each optical signal and the idler light due to the FWM is processed in the case where the arrangement intervals of the optical signals of 4 waves in 1530 nm band are set to 200 Ghz, 300 Ghz and 400 Ghz, and the arrangement intervals of the optical signals of 4 waves in 1550 nm band are set to 300 Ghz, 400 Ghz and 500 Ghz. Note, in FIG. 20, as one example of specific arrangement of the respective optical signals in the case where the above arrangement intervals as described above are applied, the optical signals CH1', CH3', CH6' and CH10' are arranged in 1530 nm band, and the optical signals CH23', CH26', CH30' and CH35' are arranged in 1550 nm band. In this signal arrangement, the FWM crosstalk margin width W45 is 400 Ghz and the FWM crosstalk margin width W54 is 100 Ghz.

Figure 21:
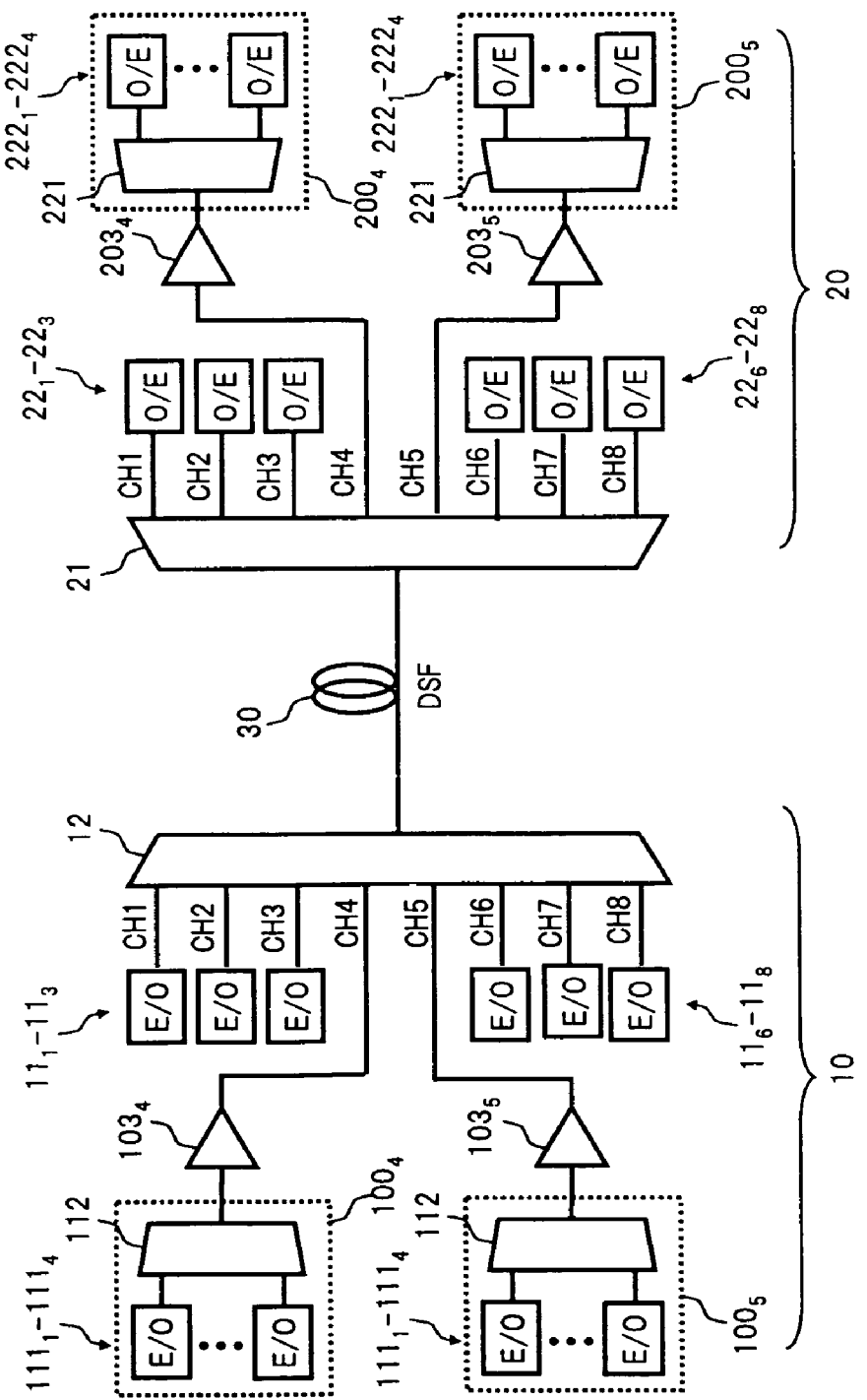
FIG. 21 is a diagram showing a system configuration example in the case where optical signals of 8 waves corresponding to the DWDM system are added, related to the sixth embodiment.
Figure 22:
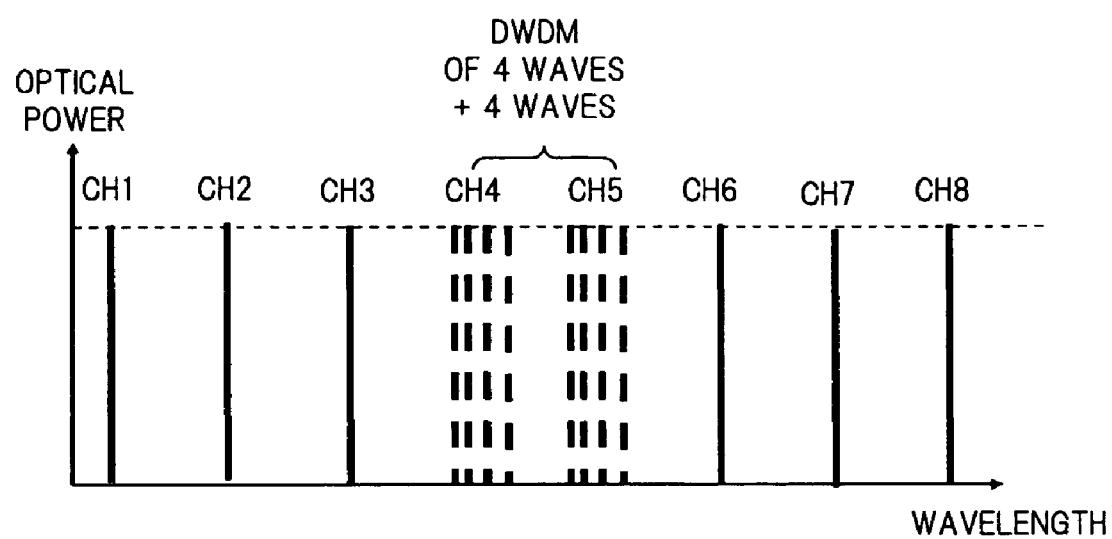
FIG. 22 is a pattern diagram showing the signal arrangement corresponding to the system configuration example in FIG. 21.

FIG. 21 shows a system configuration example in the case where optical signals of 8 waves corresponding to DWDM are added. Further, FIG. 22 is a pattern diagram showing the signal arrangement corresponding to the system configuration example in FIG. 21. The optical signals of 4 waves+4 waves corresponding to DWDM to be added in place of the optical signals CH4 and CH5 corresponding to CWDM are arranged at uneven intervals as described above, and accordingly, the occurrence of crosstalk due to the FWM is avoided. Therefore, differently from the first to fifth embodiments, it is no longer necessary to attenuate the optical signals corresponding to DWDM so as to be equal to the optical signals corresponding to CWDM, to be sent to the transmission path 30. Thus, the configuration may be such that optical amplifiers $103_4$, $103_5$, $203_4$ and $203_5$ are disposed to either the optical transmission terminal 10 or the optical reception terminal 20, or to both of the optical transmission terminal 10 and the optical reception terminal 20, to set the level of added optical signals corresponding to DWDM to be equal to or higher than the level of the optical signals corresponding to CWDM.

Figure 23:
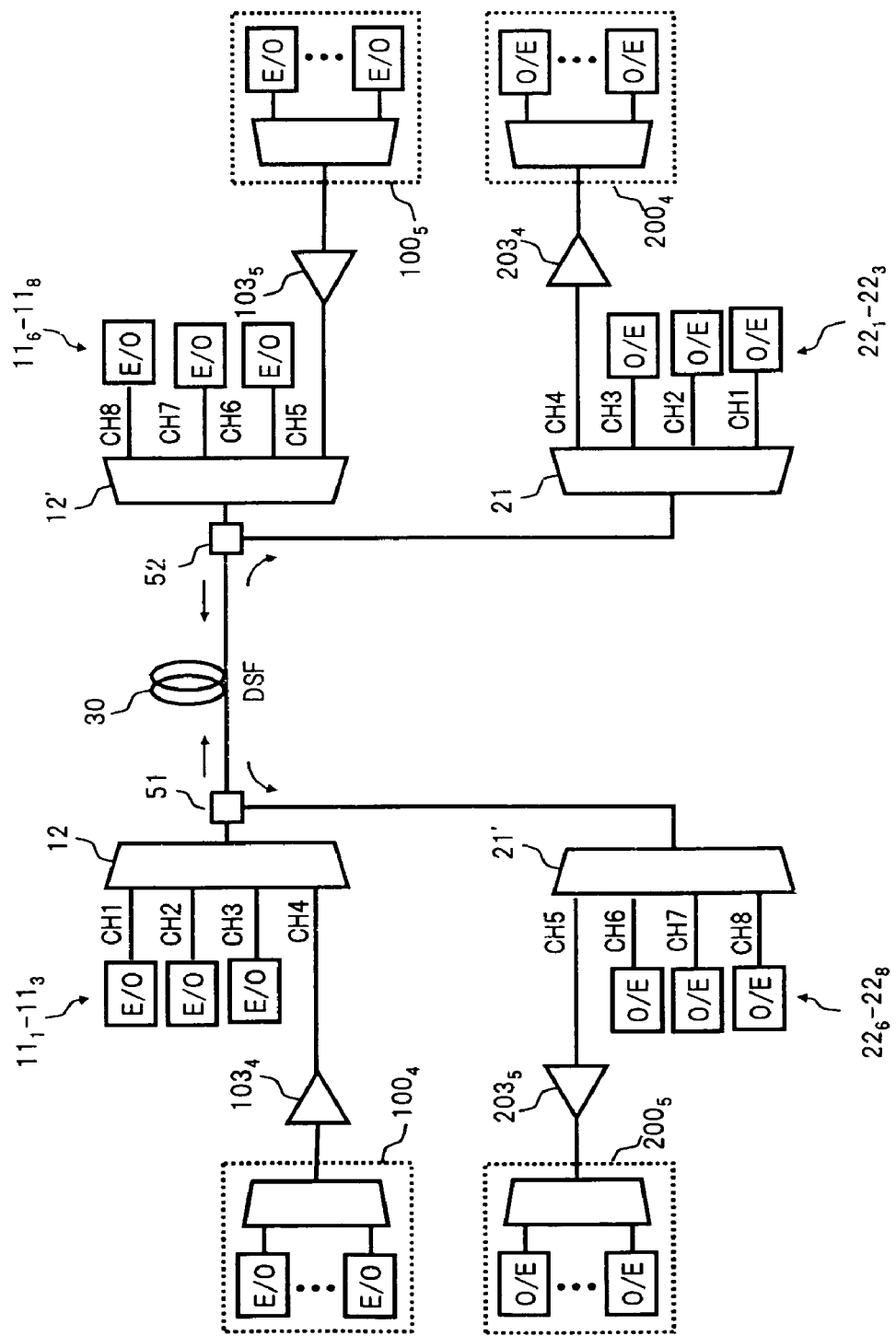
FIG. 23 is a diagram showing a configuration example of a bi-directional system in which optical signals of 4 waves corresponding to the DWDM system are added in each of an uplink and a downlink, related to the sixth embodiment.

FIG. 23 shows a configuration example of a bi-directional system in which optical signals corresponding to DWDM are added by 4 waves in each of the uplink and the downlink. Further, FIG. 24 is a pattern diagram of the signal arrangement corresponding to the bi-directional system configuration example in FIG. 23. The optical signals CH1, CH2 and CH3 corresponding to CWDM and the optical signals of 4 waves corresponding to DWDM to be added in place of the optical signal CH4 are allocated to the uplink. Further, the optical signals CH6, CH7 and CH8 corresponding to CWDM and the optical signals of 4 waves corresponding to DWDM to be added in place of the optical signal CH5 are allocated to the downlink.

In each of the configurations shown in FIG. 21 and FIG. 23, since the optical signals corresponding to DWDM are added in 1530 nm band and 1550 nm band, a DFB-LD with an external semiconductor modulator (a DFB laser with an EA modulator) can be adopted as the optical transmitters $111_1$ through $111_4$ for DWDM. The optical transmitter using the DFB-LD with the external semiconductor modulator has advantages of low cost and miniaturization compared with the optical transmitter using a LN type external modulator.

In the wavelength allocation as described above, the inter-wavelength of the respective optical signals corresponding to DWDM to be added is at least 200 Ghz. Therefore, it is no longer necessary to dispose a wavelength locker which is typically used for the wavelength stabilizing control of the optical transmitter. Thus, it becomes possible to configure a system using a miniaturized optical transmitter at a lower cost.

Note, in the sixth embodiment, the description has been made on the case where the optical signals applied with the uneven spacing wavelength allocation are sent out to the transmission path 30 using the DSF. However, the optical signals of the above wavelength allocation can be sent out not only to the transmission path using the DSF but also to a transmission path using the SMF just as they are. Namely, the configuration in the sixth embodiment also achieves an effect of independence of the types of fiber transmission path, as the system corresponding to the addition of a small number of wavelengths of about 3 waves or 4 waves.

What is claimed is:

1. A coarse wavelength division multiplexing optical transmission system, comprising:
    an optical transmission terminal including a plurality of first optical transmitters which generate a plurality of optical signals arranged on a first wavelength grid corresponding to a coarse wavelength division multiplexing system and a first multiplexer which multiplexes the optical signals output from said first optical transmitters to send out a coarse wavelength division multiplexed light to a transmission path; and
    an optical reception terminal including a first demultiplexer which demultiplexes the coarse wavelength division multiplexed light transmitted from said optical transmission terminal via the transmission path and a plurality of first optical receivers which receive optical signals of respective wavelengths output from said first demultiplexer,
    wherein at least one wavelength on said first wavelength grid is set as an additional wavelength;
    said optical transmission terminal, in place of said first optical transmitter corresponding to said additional wavelength, is provided with an additional light transmission unit including:
        a plurality of second optical transmitters which generate a plurality of optical signals arranged within a passband including said additional wavelength of said first multiplexer, on a second wavelength grid corresponding to a dense wavelength division multiplexing system, and
        a second multiplexer which multiplexes optical signals output from said second optical transmitters to output a dense wavelength division multiplexed light to said first multiplexer, and also provided with an optical attenuator which attenuates the dense wavelength division multiplexed light output from said additional light transmission unit so that the total power of the dense wavelength division multiplexed light sent out from said additional light transmission unit via said first multiplexer to the transmission path is approximately equal to the power per one wavelength of the optical signals, which are output from said first optical transmitters, corresponding to wavelengths other than said additional wavelength; and
    said optical reception terminal, in place of said first optical receiver corresponding to said additional wavelength, is provided with an additional light reception unit including;
        a second demultiplexer which demultiplexes the dense wavelength division multiplexed light output from said first demultiplexer, and
        a plurality of second optical receivers which receive optical signals of respective wavelengths output from said second demultiplexer, and also provided with an optical amplifier which amplifies the dense wavelength division multiplexed light output from said first demultiplexer at a gain according to an attenuation amount of said optical attenuator,
    wherein the first wavelength grid has an inter-wavelength larger than a dense inter-wavelength of the second wavelength grid.

2. A coarse wavelength division multiplexing optical transmission system according to claim 1, wherein said first wavelength grid is of 20 nm inter-wavelength.

3. A coarse wavelength division multiplexing optical transmission system according to claim 2, wherein when the wavelengths of the plurality of optical signals arranged on said first wavelength grid include 1530 nm and 1550 nm, at least one of the wavelengths at 1530 nm and 1550 nm is set as said additional wavelength, and C-band units are respectively used as said additional light transmission unit and said additional light reception unit corresponding to said additional wavelength.

4. A coarse wavelength division multiplexing optical transmission system according to claim 2,
wherein when the wavelengths of the plurality of optical signals arranged on said first wavelength grid include 1570 nm, 1590 nm and 1610 nm,
at least one of the wavelengths at 1570 nm, 1590 nm and 1610 nm is set as said additional wavelength, and L-band units are respectively used as said additional light transmission unit and said additional light reception unit corresponding to said additional wavelength.

5. A coarse wavelength division multiplexing optical transmission system according to claim 2,
wherein when the wavelengths of the plurality of optical signals arranged on said first wavelength grid include 1530 nm, 1550 nm, 1570 nm, 1590 nm and 1610 nm,
at least one of the wavelengths at 1530 nm and 1550 nm is set as said additional wavelength, and C-band units are respectively used as said additional light transmission unit and said additional light reception unit corresponding to said additional wavelength, and
at least one of the wavelengths at 1570 nm, 1590 nm and 1610 nm is set as said additional wavelength, and units corresponding to the L-band are respectively used as said additional light transmission unit and said additional light reception unit corresponding to said additional wavelength.

6. A coarse wavelength division multiplexing optical transmission system according to claim 1,
wherein when a plurality of wavelengths on said first wavelength grid are set as additional wavelengths,
said optical transmission terminal comprises; an additional light transmission unit capable of generating a dense wavelength division multiplexed light by multiplexing a plurality of optical signals corresponding to at least two additional wavelengths, and a third demultiplexer which demultiplexes the dense wavelength division multiplexed light output from said additional light transmission unit into components respectively corresponding to said at least two additional wavelengths, to output the demultiplexed components to said first multiplexer, and
said optical reception terminal comprises a third multiplexer which multiplexes the dense wavelength division multiplexed lights respectively corresponding to said at least two additional wavelengths, output from said first multiplexer, and an additional light reception unit capable of receiving the dense wavelength division multiplexed light output from said third multiplexer.

7. A coarse wavelength division multiplexing optical transmission system according to claim 1,
wherein when a dispersion-shifted fiber is used for said transmission path,
a wavelength within the L-band, among the wavelengths of the plurality of optical signals arranged on said first grid is set as said additional wavelength.

8. A coarse wavelength division multiplexing optical transmission system according to claim 1,
wherein said second wavelength grid is of 0.8 nm inter-wavelength.

9. A coarse wavelength division multiplexing optical transmission system according to claim 1,
wherein said second wavelength grid is of 0.4 nm inter-wavelength.

10. A coarse wavelength division multiplexing optical transmission method, for
generating, in a plurality of first optical transmitters, a plurality of optical signals arranged on a first wavelength grid corresponding to a coarse wavelength division multiplexing system;
sending out, to a transmission path, a coarse wavelength division multiplexed light obtained by multiplexing, in a first multiplexer, the optical signals output from said first optical transmitters;
demultiplexing, in a first demultiplexer, the coarse wavelength division multiplexed light transmitted on said transmission path; and
receiving, in a plurality of first optical receivers, said demultiplexed optical signals of respective wavelengths,
wherein at least one wavelength on said first wavelength grid is set as an additional wavelength;
on a transmission side, in place of the optical signal output to said first multiplexer from said first optical transmitter corresponding to said additional wavelength, a plurality of optical signals arranged within a passband including said additional wavelength of said first multiplexer, is generated in a plurality of second optical transmitters, on a second wavelength grid corresponding to a dense wavelength division multiplexing system, and a dense wavelength division multiplexed light obtained by multiplexing the output signals output from said second optical transmitters by a second multiplexer, is output to said first multiplexer; and also the dense wavelength division multiplexed light is attenuated by an optical attenuator so that the total power of the dense wavelength division multiplexed light sent out via said first multiplexer to the transmission path is approximately equal to the power per one wavelength of the optical signals, which are output from said first optical transmitters, corresponding to wavelengths other than said additional wavelength; and
on a reception side, in place of the reception of the optical signals by said first optical receiver corresponding to said additional wavelength, the dense wavelength division multiplexed light output from said first demultiplexer, is demultiplexed by a second demultiplexer, and said demultiplexed optical signals of respective wavelengths are received by a plurality of second optical receivers; and also the dense wavelength division multiplexed light output from said first demultiplexer is amplified at a gain according to an attenuation amount of said optical attenuator,
wherein the first wavelength grid has an inter-wavelength larger than a dense inter-wavelength of the second wavelength grid.

11. A coarse wavelength division multiplexing optical transmission method according to claim 10,
wherein an optical communication service capable of adding optical signals, which exceed the maximum number of signals capable to be arranged on said first wavelength grid, is provided.

12. A coarse wavelength division multiplexing optical transmission system, comprising:
an optical transmission terminal including a plurality of first optical transmitters which generate a plurality of optical signals arranged on a first wavelength grid corresponding to a coarse wavelength division multiplexing system and a first multiplexer which multiplexes the optical signals output from said first optical transmitters to send out a coarse wavelength division multiplexed light to a transmission path; and an optical reception terminal including a first demultiplexer which demultiplexes the coarse wavelength division multiplexed light transmitted from said optical transmission terminal via the transmission path and a plurality of first optical receivers which receive optical signals of respective wavelengths output from said first demultiplexer, wherein at least one of wavelengths 1530 nm and 1550 nm among wavelengths of the plurality of optical signals arranged on said first wavelength grid is set as an additional wavelength;

said optical transmission terminal having an additional light transmission unit that in place of a first optical transmitter corresponding to said additional wavelength, the additional light transmission unit including;

a plurality of second optical transmitters which generate optical signals of 3 waves or 4 waves arranged at uneven intervals within a passband including said additional wavelength of said first multiplexer, on a second wavelength grid corresponding to a dense wavelength division multiplexing system, frequencies of the generated optical signals being different from frequencies at which idler lights are generated in the transmission path due to four-wave mixing, a second multiplexer which multiplexes optical signals output from said second optical transmitters to output a dense wavelength division multiplexed light to said first multiplexer; and said optical reception terminal, in place of said first optical receiver corresponding to said additional wavelength, is provided with an additional light reception unit including;

a second demultiplexer which demultiplexes the dense wavelength division multiplexed light output from said first demultiplexer, and a plurality of second optical receivers which receive optical signals of respective wavelengths output from said second demultiplexer, wherein the first wavelength grid has an inter-wavelength larger than wavelength distances between the waves of the second wavelength grid.

13. A coarse wavelength division multiplexing optical transmission system according to claim 12, wherein said optical transmission terminal sets a combination of frequency intervals of said optical signals of 4 waves to 200 GHz, 300 GHz and 400 GHz, when the optical signals of 4 waves are arranged on said second wavelength grid for each of additional wavelengths 1530 nm and 1550 nm.

14. A coarse wavelength division multiplexing optical transmission system according to claim 12, wherein said optical transmission terminal sets a combination of frequency intervals of said optical signals of 4 waves corresponding to the additional wavelength 1530 nm to 200 GHz, 300 GHz and 400 GHz, and sets a combination of frequency intervals of said optical signals of 4 waves corresponding to the additional wavelength 1550 nm to 300 GHz, 400 GHz and 500 GHz, when the optical signals of 4 waves are arranged on said second wavelength grid for each of additional wavelengths 1530 nm and 1550 nm.

15. A coarse wavelength division multiplexing optical transmission system according to claim 12, wherein said plurality of second optical transmitters each includes a DFB laser with an external semiconductor modulator.

16. A coarse wavelength division multiplexing optical transmission method, for generating, in a plurality of first optical transmitters, a plurality of optical signals arranged on a first wavelength grid corresponding to a coarse wavelength division multiplexing system;

sending out, to a transmission path, a coarse wavelength division multiplexed light obtained by multiplexing, in a first multiplexer, the optical signals output from said first optical transmitters;

demultiplexing, in a first demultiplexer, the coarse wavelength division multiplexed light transmitted on said transmission path; and receiving, in a plurality of first optical receivers, said demultiplexed optical signals of respective wavelengths, wherein at least one of wavelengths 1530 nm and 1550 nm among wavelengths of the plurality of optical signals arranged on said first wavelength grid is set as an additional wavelength;

on a transmission side, in place of the optical signal output to said first multiplexer from said first optical transmitter corresponding to said additional wavelength, optical signals of 3 waves or 4 waves arranged at uneven intervals within a passband including said additional wavelength of said first multiplexer, are generated in a plurality of second optical transmitters, on a second wavelength grid corresponding to a dense wavelength division multiplexing system, frequencies of the generated optical signals 3 waves or 4 waves arranged at uneven intervals being different from frequencies at which idler lights are generated in the transmission path due to four-wave mixing, and a dense wavelength division multiplexed light obtained by multiplexing the output signals output from said second optical transmitters by a second multiplexer, is output to said first multiplexer; and on a reception side, in place of the reception of the optical signals by said first optical receiver corresponding to said additional wavelength, the dense wavelength division multiplexed light output from said first demultiplexer, is demultiplexed by a second demultiplexer, and said demultiplexed optical signals of respective wavelengths are received by a plurality of second optical receivers, wherein the first wavelength grid has an inter-wavelength larger than wavelength distances between the waves of the second wavelength grid.

17. A coarse wavelength division multiplexing optical transmission system, comprising:

an optical transmission terminal multiplexing a plurality of coarse wavelength multiplexed signals, and including for at least one of the coarse wavelength division signals a light transmission unit comprising:

a multiplexer multiplexing a plurality of dense wavelength division signals within a passband including said at least one of the coarse wavelength division signals; and an optical attenuator which attenuates a dense wavelength division multiplexed light output from said multiplexer so that a power of the dense wavelength division multiplexed light is approximately equal to power of any other of the coarse wavelength division signals; and an optical reception terminal, receiving and demultiplexing the coarse wavelength multiplexed signal, and including for the at least one of the coarse wavelength division signals a light reception unit comprising:

an optical amplifier which amplifies the dense wavelength division multiplexed light corresponding to said at least one of the coarse wavelength division signals at a gain according to an attenuation amount of said optical attenuator; and a demultiplexer which demultiplexes the amplified dense wavelength division multiplexed light corresponding to said at least one of the coarse wavelength division signals into the plurality of dense wavelength division signals wherein a coarse inter-wavelength of the coarse wavelength multiplexes signals is larger than a dense inter-wavelength of the dense wavelength division signals.

* * * * *

UNITED STATES PATENT AND TRADEMARK OFFICE
CERTIFICATE OF CORRECTION

PATENT NO. : 7,831,118 B2
APPLICATION NO. : 11/041433
DATED : November 9, 2010
INVENTOR(S) : Yoichi Oikawa et al.

It is certified that error appears in the above-identified patent and that said Letters Patent is hereby corrected as shown below:

Column 1, Line 10 delete "entirely." and insert -- entirety. --, therefor.

Column 18, Lines 47-48 in Claim 1, delete "including;" and insert -- including: --, therefor.

Column 21, Line 19 in Claim 12, delete "including;" and insert -- including: --, therefor.

Column 21, Lines 35-36 in Claim 12, delete "including;" and insert -- including: --, therefor.

Column 24, Line 7 in Claim 17, delete "multiplexes" and insert -- multiplexed --, therefor.

Signed and Sealed this
Fifteenth Day of February, 2011

David J. Kappos
*Director of the United States Patent and Trademark Office*